United States Patent [19]

Suzuki

[11] Patent Number: 5,559,854
[45] Date of Patent: Sep. 24, 1996

[54] SUBSCRIBER'S LINE TESTING APPARATUS

[75] Inventor: Yasuo Suzuki, Kawasaki, Japan

[73] Assignee: Fujitsu Limited, Kanagawa, Japan

[21] Appl. No.: 205,418

[22] Filed: Mar. 3, 1994

[30] Foreign Application Priority Data

Sep. 20, 1993 [JP] Japan .................................. 5-232676

[51] Int. Cl.⁶ .................................................. H04M 1/24
[52] U.S. Cl. .......................................................... 379/27
[58] Field of Search ............................. 379/1, 8, 21, 27, 379/29, 30; 370/15

[56] References Cited

U.S. PATENT DOCUMENTS 4,688,208  8/1987  Kawaguchi ............................ 370/15

*Primary Examiner*—Stephen Chin
*Assistant Examiner*—Kevin Kim

[57] ABSTRACT

A testing apparatus for testing subscriber's lines of a communication system having a communication control unit with a plurality of subscriber's circuits for processing analog signals, which enter from the subscriber's lines, and a digital signal from the digital transmission line. The testing apparatus includes an information input unit for entering identifying information for specifying a subscriber's circuit in correspondence with each subscriber's line, and test-path specifying information. Each subscriber's circuit has a coder/decoder and a test path generator for establishing a test path on the side of a communication control unit on the basis of the test-path specifying information. The testing apparatus further has a communication unit for sending test-path specifying information to the specified subscriber's circuit, a connecting unit for connecting a testing unit for applying a test signal to the apparatus, and a test-path forming unit for forming a test path on the side of the testing apparatus. A test signal from the testing unit is inputted to the test path of the specified subscriber's circuit and an answer signal, which arrives via the test path, is inputted to the testing unit.

10 Claims, 24 Drawing Sheets

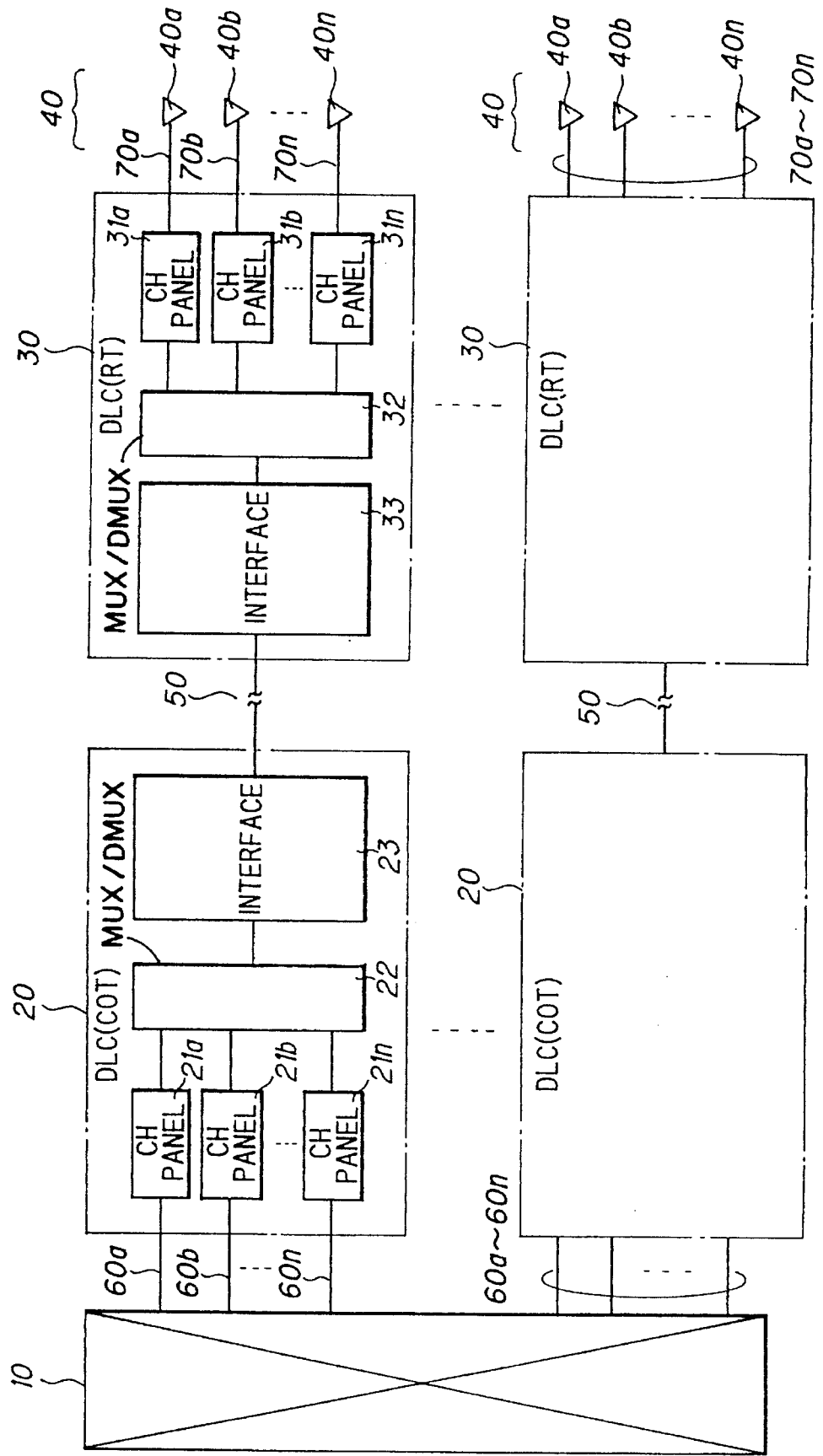

SUBSCRIBER'S LINE TESTING APPARATUS

BACKGROUND OF THE INVENTION

This invention relates to an apparatus for testing a subscriber's line. More particularly, the invention relates to a subscriber's line testing apparatus for testing subscriber's lines accommodated by a DLC (digital loop carrier).

In sparsely populated areas where residences are dispersed at comparatively great distances, a switch (exchange) cannot be provided at each residence because of the costs involved. Accordingly, a switch is provided in one town, a DLC is provided on the switch side and on the side of each residence, and the DLC on the residence side and the DLC on the switch side are connected by a time-shared multiplex transmission line.

A plurality of subscriber's terminals such as an ordinary household telephone, a public telephone and a data terminal are connected to the DLC on the residence side via analog subscriber's lines (referred to as "terminal-side subscriber's lines"). The DLC on the side of the residence subjects an analog signal, which enters from each terminal-side subscriber's line, to an A/D conversion, and sends the digital signal, which has been obtained by the A/D conversion, to a digital transmission line upon subjecting the digital signal to time-shared multiplexing. Further, the DLC on the side of the residence demultiplexes the time-shared multiplexed signal that has entered from the digital transmission line, subjects the separated digital signal to a D/A conversion and sends the analog signal to the terminal-side subscriber's line.

The DLC on the switch side is connected to the switch via a plurality of analog subscriber's lines (referred to as "switch-side subscriber's lines"). This DLC subjects an analog signal, which enters from the switch via each switch-side subscriber's line, to an A/D conversion, and sends the digital signal, which has been obtained by the A/D conversion, to a digital transmission line upon subjecting the digital signal to time-shared multiplexing. Further, the DLC on the switch side demultiplexes the time-shared multiplexed signal that has entered from the digital transmission line, subjects the separated digital signal to a D/A conversion and transmits the resulting analog signal to the switch-side subscriber's line.

The switch-side subscriber's lines and the terminal-side subscriber's lines are in 1:1 correspondence. Regardless of the fact that the DLC on the switch side and the DLC on the terminal side are interconnected by a single digital transmission line, functionally it is just as if the subscriber's terminals and switch were interconnected independently by respective subscriber's lines. As a result, in a case where there is a great distance between the place of installation of the switch and each residence, an advantage obtained is that the cost of laying cables can be reduced by using the DLCs.

FIG. 18 is a block diagram illustrating the configuration of a communication system that employs DLCs. The system includes a switch 10, a switch-side DLC 20, a terminal-side DLC 30 provided at each residence, subscriber's terminals 40, a time-shared multiplexed digital transmission line 50, switch-side subscriber's lines 60a~60n, and terminal-side subscriber's lines 70a~70n.

The switch-side DLC [DLC(COT), where "COT" is the abbreviation of "central office terminal"] and the terminal-side DLC [DLC(RT), where "RT" is the abbreviation of "remote terminal"] are identical in construction. Channel panels (CH panels) 21a~21n, 31a~31n are provided for respective ones of the subscriber's lines. Also provided are multiplexer/demultiplexers (MUX/DMUX) 22, 32 and interfaces 23, 33. The CH panels convert analog signals, which enter from the subscriber's lines 60a~60n and 70a~70n, into digital signals and output the digital signals to the digital-transmission side. Further, the CH panels convert digital signals, which have entered from the side of the digital transmission line, into analog signals and send the analog signals to the subscriber's lines 60a~60n and 70a~70n.

The multiplexer/demultiplexers (MUX/DMUX) 22, 32 each have a multiplexer and a demultiplexer. The multiplexer outputs n-items of digital data, which are the result of digital conversion by each CH panel, to the digital-transmission side upon subjecting the data to time-shared multiplexing. The demultiplexer demultiplexes the time-shared multiplexed data, which has entered from the side of the digital transmission line, and inputs the demultiplexed data to each CH panel. Interfaces 23, 33 convert the unipolar time-shared shared multiplexed signal, which has entered from the corresponding multiplexer, into a bipolar time-shared multiplexed signal and inputs the signal to the digital transmission line 50. The interfaces 23, 33 also perform a bipolar-unipolar conversion, which is the reverse of the foregoing conversion, and input the resulting signals to the corresponding demultiplexers.

Ordinarily, n-number of subscriber's lines (where n=24) are connected to each DLC, 24 lines of digital data are subjected to time-shared multiplexing and the resulting data is sent to the opposing DLC in the form of a bipolar signal at a transmission rate of 1.5M. FIG. 19 is a diagram of frame composition, in which one frame is composed of 24 time slots and digital data on 1st~24th lines (channels) is inserted into 1st~24th time slots (Time Slots #1~190 24). A frame bit F is placed at the head of each frame, and one super frame is composed of 12 frames. An A bit and a B bit serve as signaling bits of each channel. The A bit is inserted in an eighth bit of each time slot in the 6th frame (DSI Frame #6), and the B bit is inserted in the eighth bit of each time slot in the 12th frame (DSI Frame #12). It is possible to communicate the status of a telephone by combining the signaling bits A and B and sending them, when the combination is denoted by (A, B), the off-hook status is communicated by rendering the (A, B) same as (0,0), on-hook status (1,0), IDLE status (1,1) and ringing status (1, alternating 1/0). Here "alternating 1/0" means that 1,0 alternate.

FIG. 20 is a block diagram illustrating the construction of the CH panel. TIP and RING represent subscriber's lines, which are connected to an outside-line metallic cable. More specifically, in a case where the DLC is provided on the terminal side, the subscriber's line is connected to a subscriber's terminal (mainly a telephone). In a case where the DLC is provided on the switch side, the subscriber's line is connected to the switch. BAT represents a subscriber's feeder that supplies a current via the TIP/RING lines in order to drive the subscriber's terminal (private equipment such as a telephone). ON/OFF HOOK DET represents an on-hook/off-hook status detector which, by monitoring the value of the current that flows through the TIP/RING lines, detects the on-hook/off-hook state of the subscriber's terminal. RINGING GEN represents a ringing signal generator for generating a ringing control signal to ring a bell on the subscriber's terminal. Further, 2W/4W represents a two-wire/four-wire converter for converting the TIP/RING lines, in which a transmitted signal and a received signal are fully duplexed, into four individual lines on the transmitting and receiving sides. The converter 2W/4W is constituted by a converting transformer and a balancing network.

TX AMP denotes a transmitting-side controller for converting the level of an analog signal on the transmitting side into a stipulated value of the analog input level of a CODEC, described below. RX AMP represents a receiving-side amplifier for converting the level of the output analog signal of the CODEC into a stipulated value of the analog input level of the subscriber's terminal. The CODEC is a coder/decoder for effecting a conversion between analog and digital signals, inserting a signaling bit at conversion of a digital signal and extracting the signaling bit at the conversion to an analog signal. SIGNALING DET generates a signaling bit that is in accordance with a CPU command and notifies the CPU of the signaling bit extracted by the CODEC. TX/RX represent a pair of digital signal lines on transmitting and receiving sides. The digital signal sent from the lines TX are multiplexed in 24 channels on the multiplexer/demultiplexer which is interfaced with the side of the digital transmission line 50. The multiplexer/demultiplexer demultiplexes the multiplexed signal and inputs the demultiplexed signal to each line RX. The CPU is for control of the CH panel and ordinarily executes various signaling bit processing such as commanding the generation of a signaling bit corresponding to the status of the subscriber's terminal, commanding the transmission of a control signal to the subscriber's terminal conforming to a received signaling bit, etc.

FIGS. 21 and 21A show a diagram for describing operation when the on-hook state is in effect (i.e., when the subscriber is not in a telephone conversation). Numeral 80 denotes a repeater.

① The switch 10 applies a normal battery value (a current value that prevails when a conversation is not being carried out) to the CH panel (COT) 21 from the feeder.

② The CH panel (COT) 21 detects that the normal battery value is being supplied from the switch 10 and sends an IDLE code (in which the A and B bits are both "1") to the CH panel (RT) 31.

③ The CH panel (RT) 31 detects the IDLE code, applies the normal battery value to the subscriber's terminal (telephone) 40 and transmits an on-hook code (in which the A and B bits are both "0") to the CH panel (COT) 21.

When the on-hook state is in effect, steps ①②③ above are executed continuously.

FIGS. 22 and 22A show a diagram for describing the placing of an outgoing call.

① When the handset of the telephone 40 is lifted in the on-hook state, the load within the telephone changes and so does the battery value.

② The CH panel (RT) 31 monitors the change in the battery value. The CH panel 31 detects a change in the battery value to recognize that the off-hook state has been attained and then transmits an off-hook code (in which the A bit is "1" and the B bit is "0") to the CH panel (COT) 21.

③ The CH panel (COT) 21 detects the off-hook code and shows the switch 10 a load which is the same as that of the telephone 40. As a result, the battery value changes and the switch 10 recognizes that the off-hook state has been attained.

④ Next, dial pulses are sent from the telephone 40 to the switch 10.

⑤ After transmission of the dial pulses, the CH panel (COT) 21 sends the IDLE code (1,1) to the CH panel (RT) 31 so that a transition is made to a state in which conversation is possible.

FIGS. 23 and 23A show a diagram for describing operation when an incoming call is terminated.

① When an outgoing call is placed to the telephone 40 from another subscriber's terminal in the on-hook state, the switch 10 accommodating the telephone 40 sends a ringing signal to the CH panel (COT) 21.

② After detecting the ringing signal, the CH panel (COT) 21 transmits a RINGING code (in which the A bit is 1 and the B bit is "alternating 1/0") to the CH panel (RT) 31.

③ When the CH panel (RT) 31 detects the ringing code, it sends a ringing signal to the telephone 40 so that the latter issues a ringing tone.

④ When the terminating party lifts the handset to take it off the hook in response to the ringing tone, the battery value changes.

⑤ The CH panel (RT) 31 detects that the battery value has changed, recognizes that the off-hook state is in effect and transmits the off-hook code (1,0) to the CH panel (COT) 21.

⑥ Upon detecting the off-hook code, the CH panel (COT) 21 changes the battery value and informs the switch 10 of the fact that the telephone 40 has been taken off the hook.

⑦ In response to notification of the fact that the telephone 40 has been taken off the hook, the switch halts the transmission of the ringing signal.

⑧ The CH panel (COT) 21 recognizes that the ringing signal has been halted and transmits the IDLE code to the CH panel (RT) 31, whereby a transition is made to the state in which a telephone conversion can be carried out.

FIGS. 24 and 24A show a diagram for describing operation at the end of a conversation.

① When a conversation ends and the handset is hung up (placed on the hook), the battery value changes to the normal battery value.

② Upon detecting the normal battery value, the CH panel (RT) 31 transmits the on-hook code (1,0) to the CH panel (COT) 21.

③ Upon detecting the on-hook code, the CH panel (COT) 21 makes the load shown to the switch the same as the load that prevails when the telephone 40 is in the on-hook state and returns the battery value to the normal battery value. As a result, the switch 10 recognizes that the conversation has ended.

It is described above that the number of subscriber's lines connected to one DLC is 24. However, this number approaches 200 in a system of the largest scale. When a failure occurs in a line at a DLC that is already being provided with service from the switch 10, maintenance itself is very difficult to perform since there are so many lines connected to one DLC. Moreover, an operation for recognizing the section of the faulty location involves a great amount of labor. Consequently, in order to prevent an initial failure and perform a level diagnosis adjustment, it is necessary that the DLC be tested successively, section by section, from the installation stage.

There are two methods of performing a conventional test of subscriber's lines accommodated by a DLC. (1) The first testing method involves measuring a test signal, which is outputted directly by a switch, using a measuring device connected in place of the subscriber's telephone, whereby the status of the line is ascertained. (2) The second testing method involves attaching a jack to each CH panel mounted on the DLC, connecting a measuring device to each opposing CH panel via the jack, outputting a test signal to the digital transmission line from the measuring device of the CH panel on one side in a state in which the connection to the switch is cut off, and measuring the test signal using the measuring device of the opposing CH panel, whereby the status of the line is ascertained.

In the above-described conventional testing methods, testing cannot be carried out unless a cable (digital transmission line) is laid between the DLCs.

Further, even if testing is performed upon laying a cable, normality/abnormality through the entirety of a subscriber's line is merely judged, and the section of the faulty location where a line has failed cannot be recognized.

Furthermore, in the first testing method of the prior art described above, it is necessary to change the connection of the testing device each time the line tested is changed. In the second testing method, the connection of the measuring device must be changed at both of the opposing CH panels. This makes the test very troublesome.

SUMMARY OF THE INVENTION

Accordingly, an object of the present invention is to provide a subscriber's line testing apparatus which, with a DLC on one side in the installed state, is capable of testing subscriber's lines that have been laid up to this point in time.

Another object of the present invention is to provide a subscriber's line testing apparatus for dividing subscriber's lines into a plurality of sections and testing the lines section by section, whereby the section to which the location of a fault belongs can be recognized.

A further object of the present invention is to provide a subscriber's line testing apparatus through which a serviceman is capable of conducting a test in a simple manner without requiring that the connection of the testing device be changed for each line tested.

A further object of the present invention is to provide a subscriber's line testing apparatus through which analog and digital testing can be performed using an analog testing device.

A further object of the present invention is to provide a subscriber's line testing apparatus that is capable of testing a signaling bit detecting function and a signaling bit transmitting function in a switch or CH panel.

In accordance with the present invention, the foregoing objects are attained by providing a subscriber's line testing apparatus comprising an information input unit for entering identifying information for specifying a subscriber's circuit provided in a communication control unit in correspondence with each subscriber's line, as well as test-path specifying information each subscriber's circuit including a coder/decoder for performing an A/D conversion and a D/A conversion, and a test path generator for establishing a test path on the side of a communication system on the basis of the test-path specifying information; a communication unit for sending the test-path specifying information to the specified subscriber's circuit; a connecting unit for connecting a testing unit for testing subscriber's lines; and a test-path forming unit for forming a test path on the side of the testing apparatus for inputting a test signal from the testing unit to the test path of the specified subscriber's circuit and inputting a signal, which arrives via the test path, to the testing unit.

Further, according to the invention, the foregoing objects are attained by providing a subscriber's line testing apparatus comprising an information input unit for entering identifying information for specifying a subscriber's circuit provided in a communication control unit in correspondence with each subscriber's line, as well as test-path specifying information, each subscriber's circuit including a coder/decoder for performing an A/D conversion and a D/A conversion, and a test path generator for establishing a test path on the side of a communication system on the basis of the test-path specifying information; a communication unit for sending the test-path specifying information to the specified subscriber's circuit; first and second connecting units for connecting an analog testing unit that tests subscriber's lines; a coder/decoder for converting an analog test signal, which has entered from the second connecting unit, into a digital signal and converting a digital answer signal, which arrives via the test path, into an analog signal; and a test-path forming unit for forming a test path on the side of the testing apparatus in such a manner that an analog test signal that has entered from the first connecting unit or the digital test signal outputted by the coder/decoder is inputted to the test path of the specified subscriber's circuit, an answer signal is inputted to the analog testing unit via the first connecting unit if the answer signal, which arrives via the test path, is an analog signal, and inputs the answer signal to the analog testing unit via the coder/decoder and the second connecting unit if the answer signal is a digital signal.

Furthermore, the foregoing object are attained by providing a subscriber's line testing apparatus comprising a signaling-bit generating unit for generating a signaling bit inserted into a digital test signal obtained by digitally converting an analog test signal; a signaling-bit detector for detecting a signaling bit contained in a digital answer signal; a display unit for displaying identifying information of a subscriber's circuit undergoing testing and content of the detected signaling bit; and a controller for causing a prescribed signaling bit to be generated in the signaling-bit generator based upon a category of an operation verifying test, commanded from an information input unit, using a signaling bit, and inputting the content of the signaling bit, which has been detected by the signaling-bit detector, to the display unit to display the same.

Other features and advantages of the present invention will be apparent from the following description taken in conjunction with the accompanying drawings.

BRIEF DESCRIPTION OF THE DRAWINGS

FIGS. 16 and 16A show a diagram for describing an operation-verifying test, which uses a signaling bit, at the time of an incoming call;

FIG. 18 is a block diagram illustrating a communication system using a DLC according to the prior art;

FIGS. 21 and 21A show diagram for describing operation when a telephone is on the hook according to the prior art;

FIGS. 22 and 22A show a diagram for describing operation at the time of an outgoing call according to the prior art;

FIGS. 23 and 23A show a diagram for describing operation at the time of an incoming call according to the prior art.

DESCRIPTION OF THE PREFERRED EMBODIMENTS (a) General features of the invention

Figure 1:
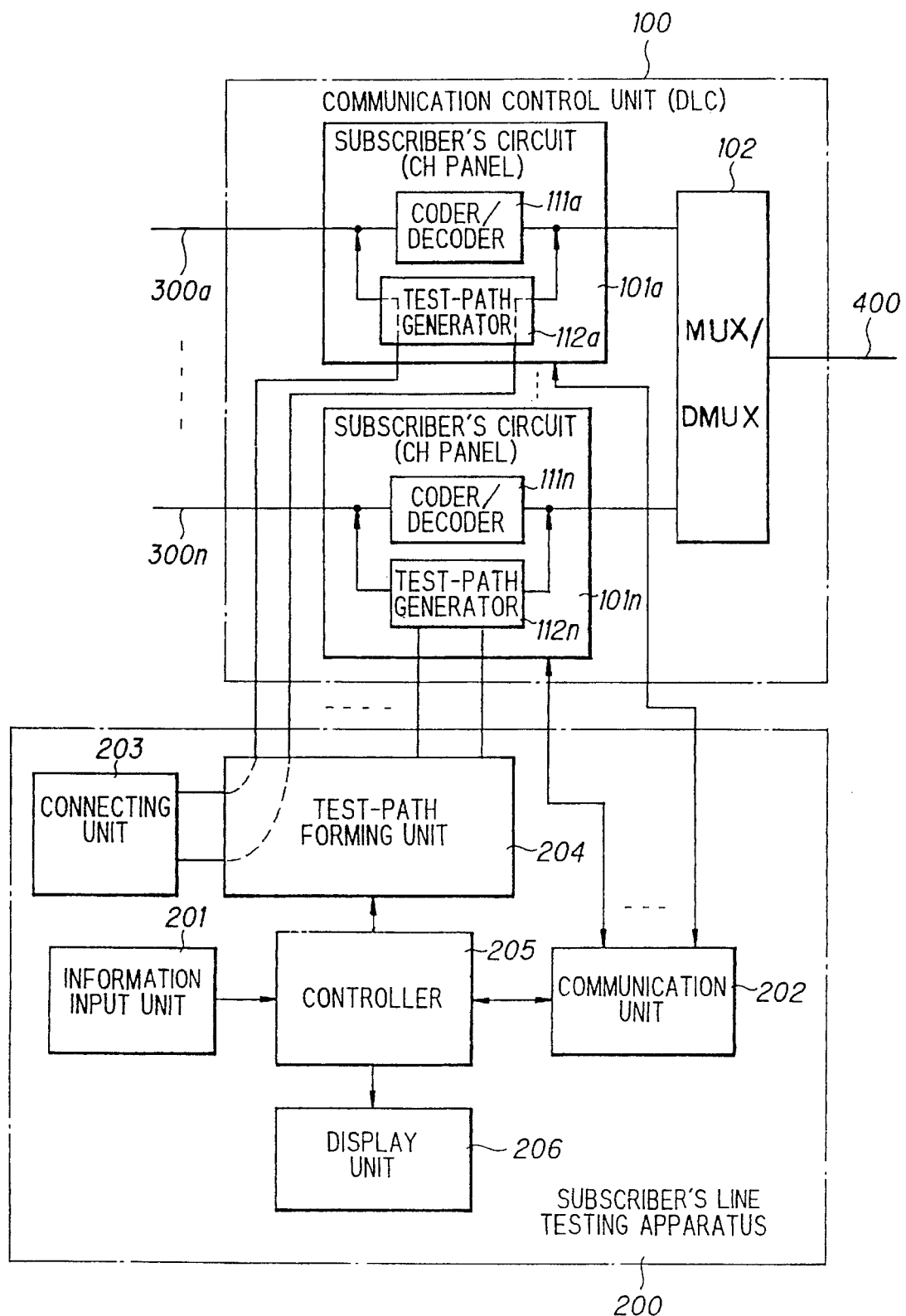
FIG. 1 is a block diagram for describing the general features of the present invention.

Numeral 100 denotes a communication control unit (DLC) for converting analog signals inputted from subscriber's lines 300a~300n into digital signals, subjecting the resulting digital signals to time-shared multiplexing and sending the resulting signals to a digital transmission line 400, demultiplexing time-shared multiplexed signals that have entered from the digital transmission line 400, converting the demultiplexed digital signals into analog signals and sending the analog signals to the subscriber's lines. Numeral 200 denotes a subscriber's line testing apparatus for testing the subscriber's line accommodated by the communication control unit 100.

The communication control unit 100 includes subscriber's circuits (CH panels) 101a~101n provided in 1:1 correspondence with subscriber's lines 300a~300n, and a multiplexer/demultiplexer 102. The subscriber's circuits 101a~101n are respectively provided with coder/decoders (CODEC) 111a~111n for performing the A/D and D/A conversion, and test path generators 112a~112n for establishing a test path on the side of the communication system.

The subscriber's line testing apparatus 200 includes an information input unit 201 for entering an identification number of a subscriber's circuit (CH panel) to be tested, as well as information specifying a test path, a communication unit 202 for sending the test-path specifying information to a specified subscriber's circuit (CH panel), a connecting unit 203 for connecting a testing device for testing subscriber's lines, a test-path forming unit 204, on the side of the testing apparatus, for inputting a test signal from the testing device to a test path of the specified subscriber's circuit and inputting a signal, which arrives via the test path, to the testing device, and a controller 205. The latter sends a test request to the specified subscriber's circuit (CH panel) via the communication unit 202. Further, after confirming a "test OK" response from the subscriber's circuit, the controller 205 causes a test path to be formed by the test-path forming unit 204. The controller 205 also sends the above-mentioned test-path specifying information from the communication unit 202 to the subscriber's circuit to form a test path on the side of the communication system. The apparatus 200 further includes a display unit 206 for displaying the information identifying the subscriber's circuit being tested, the status of the test, etc.

The number identifying a subscriber's circuit and information specifying a test path are entered from the information input unit 201. The controller 205 sends a test request to the specified subscriber's circuit (assume that this is subscriber's circuit 101a) via the communication unit 202, confirms a "test OK" response from the subscriber's circuit 101a and then forms a test path by the test-path forming unit 204. Next, the controller 205 sends the test-path specifying information from the communication unit 202 to the subscriber's circuit 101a to form a test path on the side of the communication system. Testing is conducted under these conditions. Specifically, a test signal from the testing device connected to the connecting unit 203 is inputted to the test path of the subscriber's circuit 101a via the test-path forming unit 204, and a signal that arrives via the test path is inputted from the test-path forming unit 204 to the testing device. At this time the information identifying the subscriber's circuit being tested and the status of the test are displayed on the display unit.

By way of example, in a case where the subscriber's lines 300a~300n are connected to a switch or subscriber's terminals, the test path generators 112a~112n of the subscriber's circuits 101a~101n generate test paths, on the side of the communication system, so as to input an analog test signal from the test-path forming unit 204 to the switch or terminals via the subscriber's lines 300a~300n and input answer signals from the switch or terminals to the test-path forming unit 204.

On the basis of the test-path specifying information, the test path generators 112a~112n generate test paths, on the side of the communication system, so as to input an analog test signal, which has entered from the test-path forming unit 204, to the respective coder/decoders 111a~111n and then input the digital signals which are outputted by the coder/decoders to the test-path forming unit 204, and generate test paths so as to input a digital test signal, which has entered from the test-path forming unit 204, to the coder/decoders 111a~111n and input analog signals, which are outputted by the coder/decoders, to the test-path forming unit 204.

Furthermore, in a case where a communication control unit on the side of a terminal and a communication control unit on the side of a switch are interconnected via the digital transmission line 400 so as to be capable of transmitting data to each other, the test path generators 112a~112n of one communication control unit generate test paths so as to send via the digital transmission line 400 a digital test signal, which has entered from the test-path forming unit 204, on the basis of the test-path specifying information, and the test path generators of the other communication control unit generate test paths so as to input a digital test signal, which has entered from the digital transmission line 400, to the test-path forming unit on the basis of the test-path specifying information.

Further, in a case where a communication control unit on the side of a terminal and a communication control unit on the side of a switch are connected via the digital transmission line 400 so as to be capable of transmitting data to each other and, moreover, each subscriber's line in the communication control unit 100 on the switch side is connected to the switch, the test path generators 112a–112n of the communication control unit 100 on the terminal side generate test paths, on the basis of the test-path specifying information, so as to input an analog test signal, which has entered from the test-path forming unit 204, to the coder/decoders 111a–111n, send the digital signals outputted by the coder/decoders to the switch via the digital transmission line 400 and the communication control unit on the switch side, and input an answer signal from the switch, which has been received via the communication control unit on the switch side and the digital transmission line 400, to the test-path forming unit 204 upon converting the signal from an analog signal to a digital signal.

If the arrangement described above is adopted, then, with the DLC on one side installed, the subscriber's lines that have been laid up to this point in time can be tested. Further, by dividing subscribers lines into a plurality of sections and conducting a test section by section, the section of the location at which a fault developed can be recognized and separated. Furthermore, a serviceman is capable of conducting a test in a simple manner without requiring that the connection of the testing device be changed for each line tested.

Further, both analog and digital tests can be conducted solely by an analog measuring device if there are provided first and second connecting units for connecting an analog testing device that tests subscriber's lines, and a coder/decoder for converting an analog test signal, which has entered from the second connecting unit, into a digital signal and converting a digital answer signal, which arrives via the test path on the side of the communication system, into an analog signal.

Furthermore, an arrangement may be adopted in which there are provided a signaling-bit generating unit for generating a signaling bit inserted into a digital test signal, and a signaling-bit detector for detecting a signaling bit contained in a digital answer signal. The controller 205 in this arrangement causes a prescribed signaling bit to be generated in the signaling-bit generator based upon the category of an operation verifying test, commanded from the information input unit 201, using a signaling bit, and causes the display unit to display the content of the signaling bit, which has been detected from the answer signal by the signaling-bit detector. If this arrangement is adopted, it is possible to verify the signaling-bit detecting function or signaling-bit transmitting function of the switch or CH panel.

(b) Embodiment of the invention (b-1) Overall configuration

Figure 2:
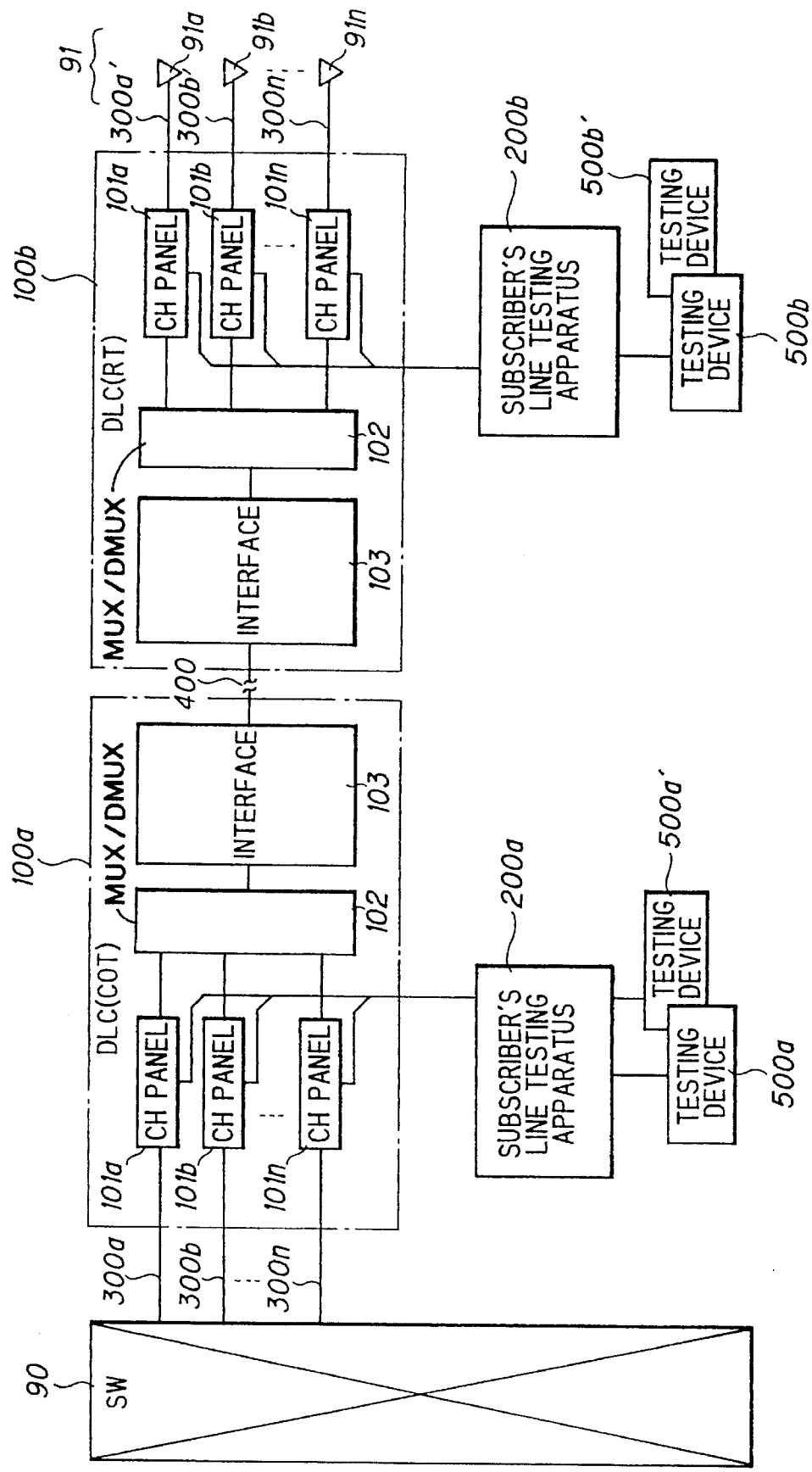
FIG. 2 is a block diagram illustrating the overall configuration of a communication system including a subscriber's line testing apparatus according to the present invention.

FIG. 2 is a block diagram illustrating the overall configuration of a communication system that includes a subscriber's line testing apparatus according to the present invention. One DLC is shown on the side of the switch and one DLC is shown on the terminal side.

As shown in FIG. 2, the system includes a switch 90, subscriber's terminals 91, a switch-side communication control unit [a DLC, which is represented by DLC(COT)] 100a, a terminal-side communication control unit [a DLC, which is represented by DLC(RT)] 100b, a subscriber's line testing apparatus 200a connected to the switch-side DLC 100a, a subscriber's line testing apparatus 200b connected to the terminal-side DLC 100b, switch-side subscriber's lines 300a–300n, terminal-side subscriber's lines 300a'–300n', the digital transmission line 400 composed of a pair of outgoing and incoming cables, testing units 500a, 500a' connected to the subscriber's testing apparatus 200a, and testing units 500b, 500b' connected to the subscriber's testing apparatus 200b.

The switch-side DLC [DLC(COT)] and terminal-side DLC [DLC (RT) ] are identical in construction. Each is provided with channel panels (CH panels) 101a–101n for respective ones of the subscriber's lines, a multiplexer/demultiplexer (MUX/DMUX) 102 and an interface 103. The CH panels convert analog signals, which enter from the subscriber's lines 300a–300n and 300a'–300n', into digital signals and output the digital signals to the digital-transmission side. Further, the CH panels convert digital signals, which have entered from the side of the digital transmission line, into analog signals and send the analog signals to the subscriber's lines 300a–300n and 300a'–300n'. The multiplexer/demultiplexer (MUX/DMUX) 102 has a multiplexer and a demultiplexer. The multiplexer outputs n-items of digital data, which are the result of digital conversion by each CH panel, to the digital-transmission side upon subjecting the data to time-shared multiplexing. The demultiplexer demultiplexes the time-shared multiplexed data, which has entered from the side of the digital transmission line, for each and every subscriber's line, and inputs the demultiplexed data to each CH panel. The interface 103 converts the unipolar time-shared multiplexed signal, which has entered from the multiplexer, into a bipolar time-shared multiplexed signal and inputs the signal to the digital transmission line 400. The interface 103 also performs a bipolar-unipolar conversion, which is the reverse of the foregoing conversion, and inputs the resulting signal to the demultiplexers.

Figure 19:
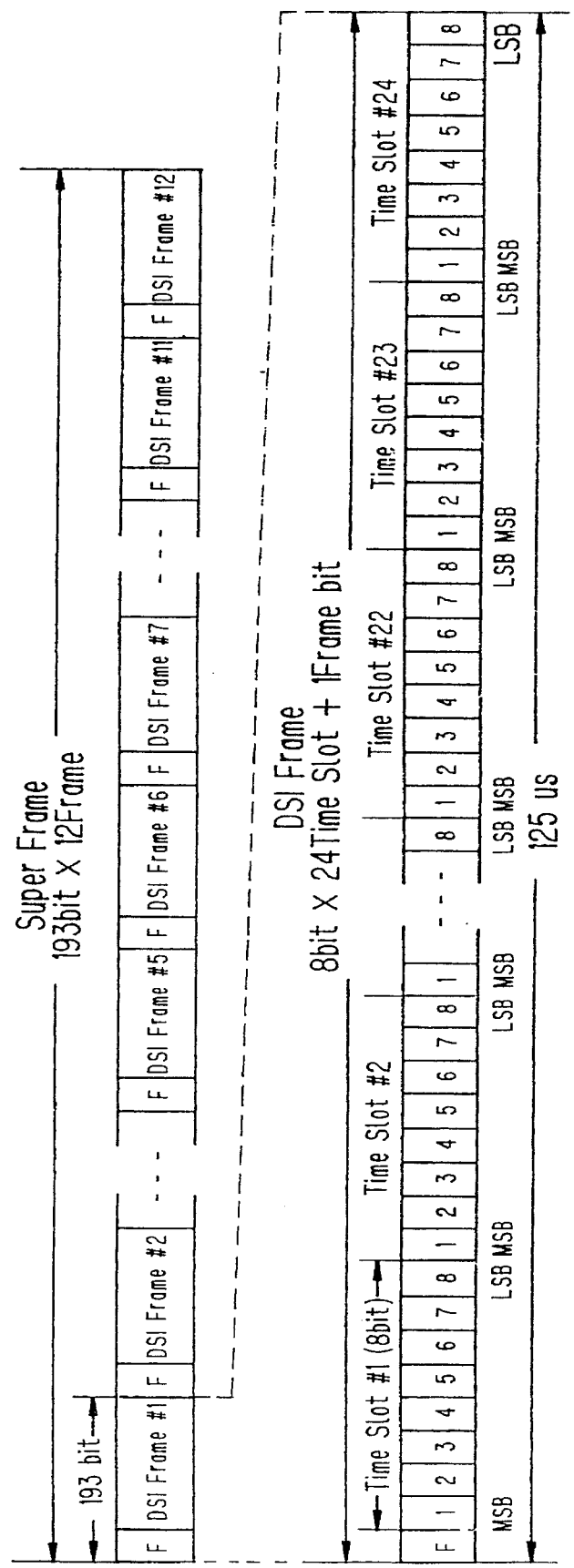
FIG. 19 is a diagram showing the composition of a frame according to the prior art.

Ordinarily, n-number of subscriber's lines (where n=24) are connected to each DLC, 24 lines of digital data are subjected to time-shared multiplexing and the resulting data is sent to the opposing DLC in the form of a bipolar signal at a transmission rate of 1.5M. It should be noted that frame composition is identical with that shown in FIG. 19.

(b-2) Construction of CH panel

Figure 3:
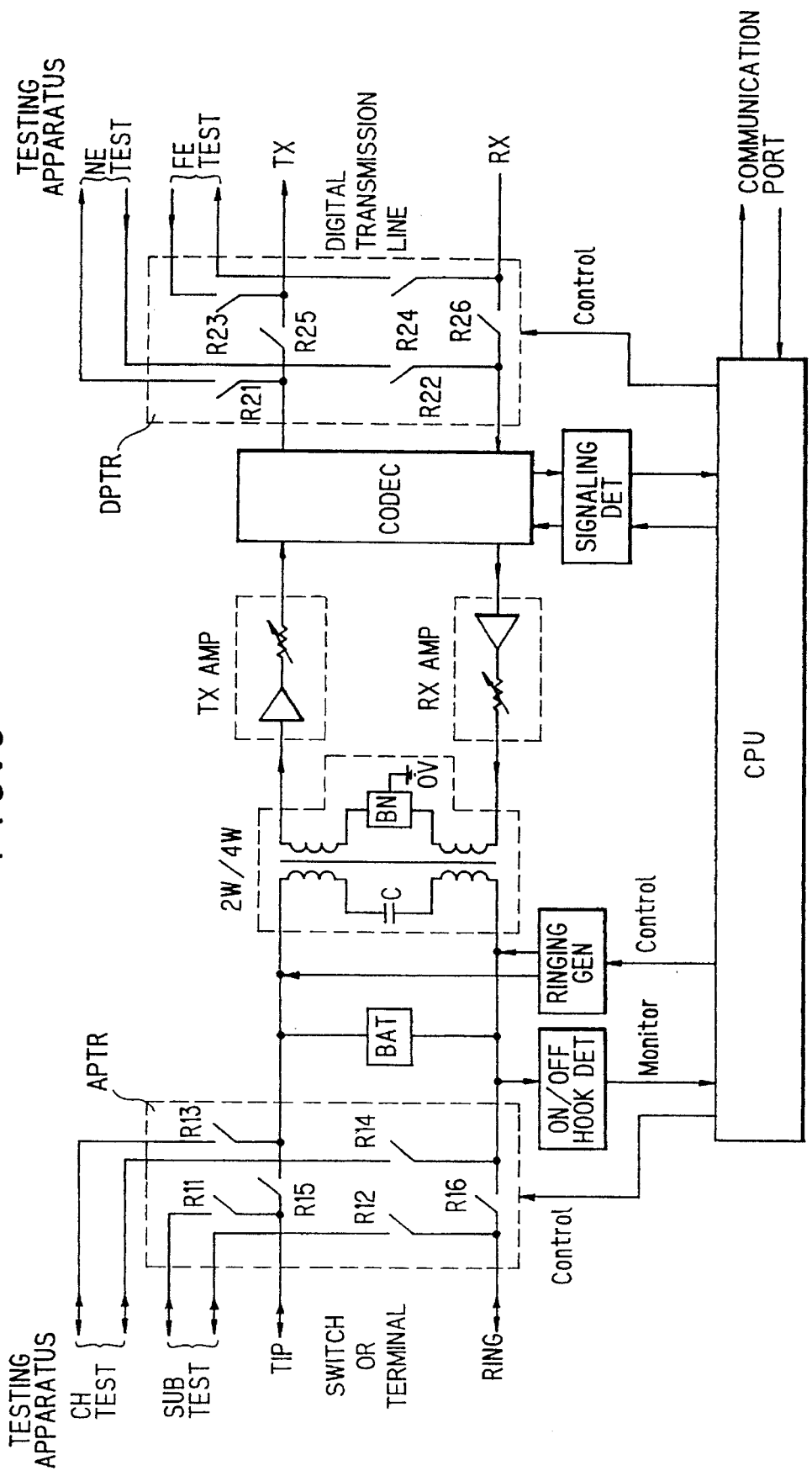
FIG. 3 is a diagram showing the construction of a CH panel according to the invention.
Figure 20:
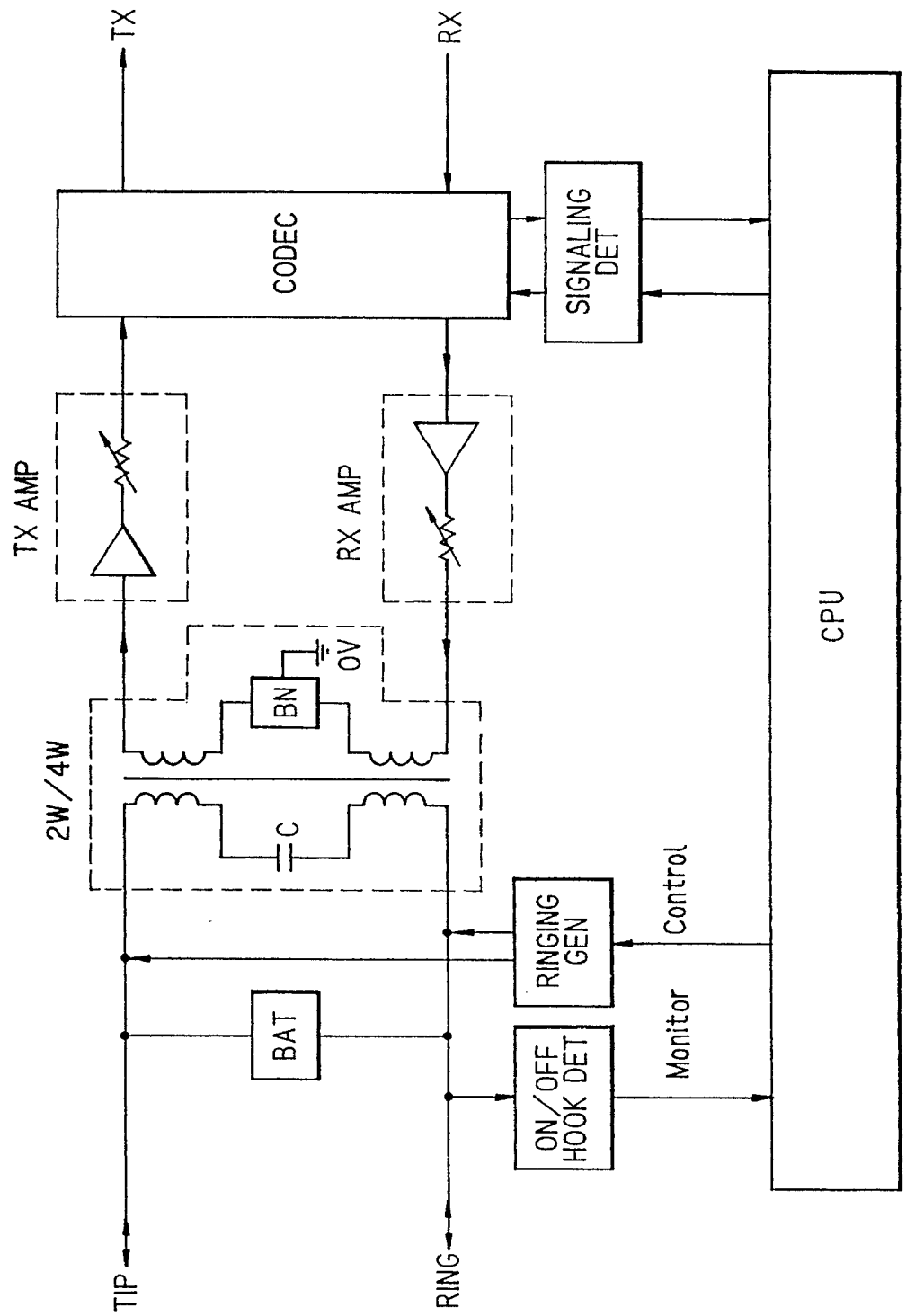
FIG. 20 is a diagram showing the construction of a CH panel according to the prior art.
Figure 21:
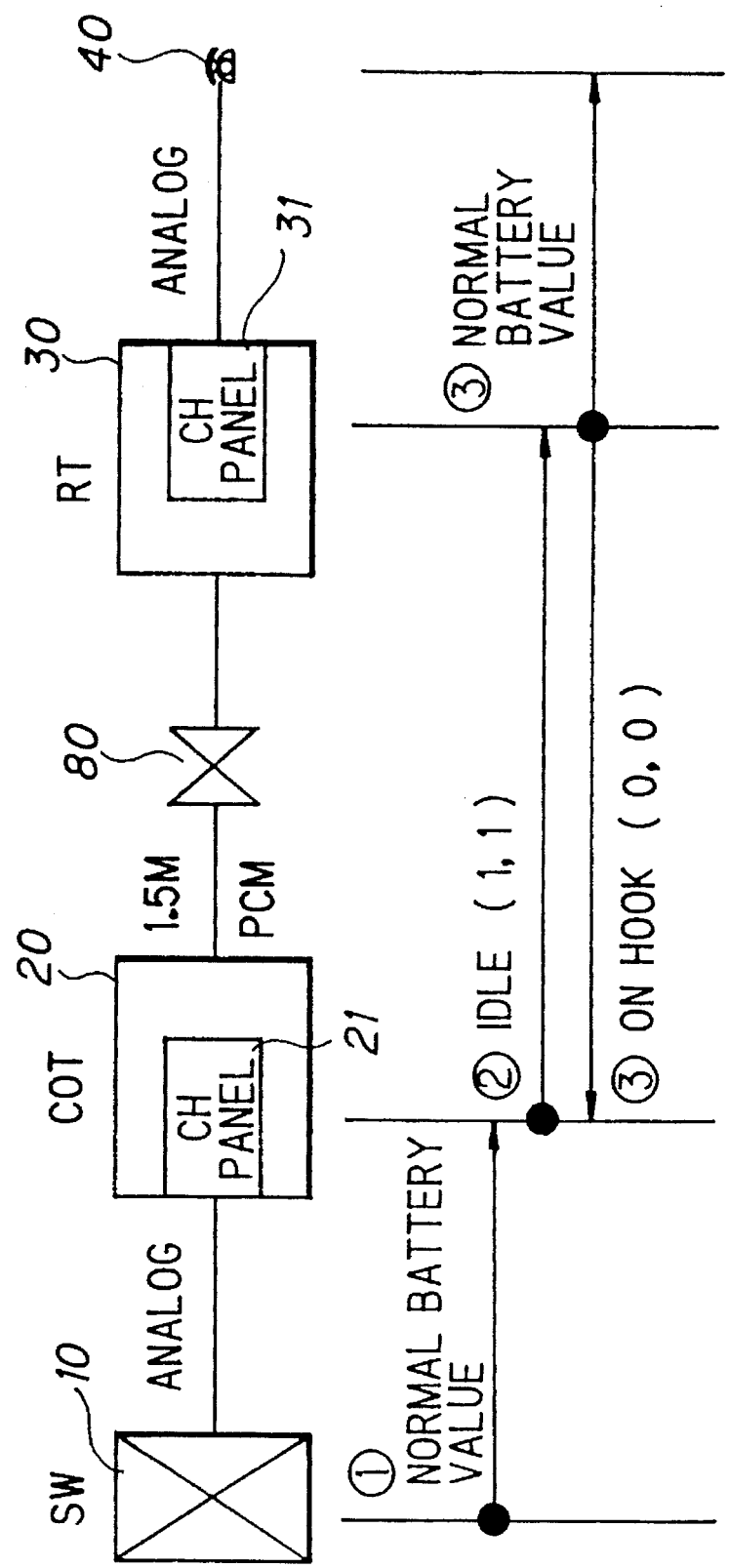
Figure 22:
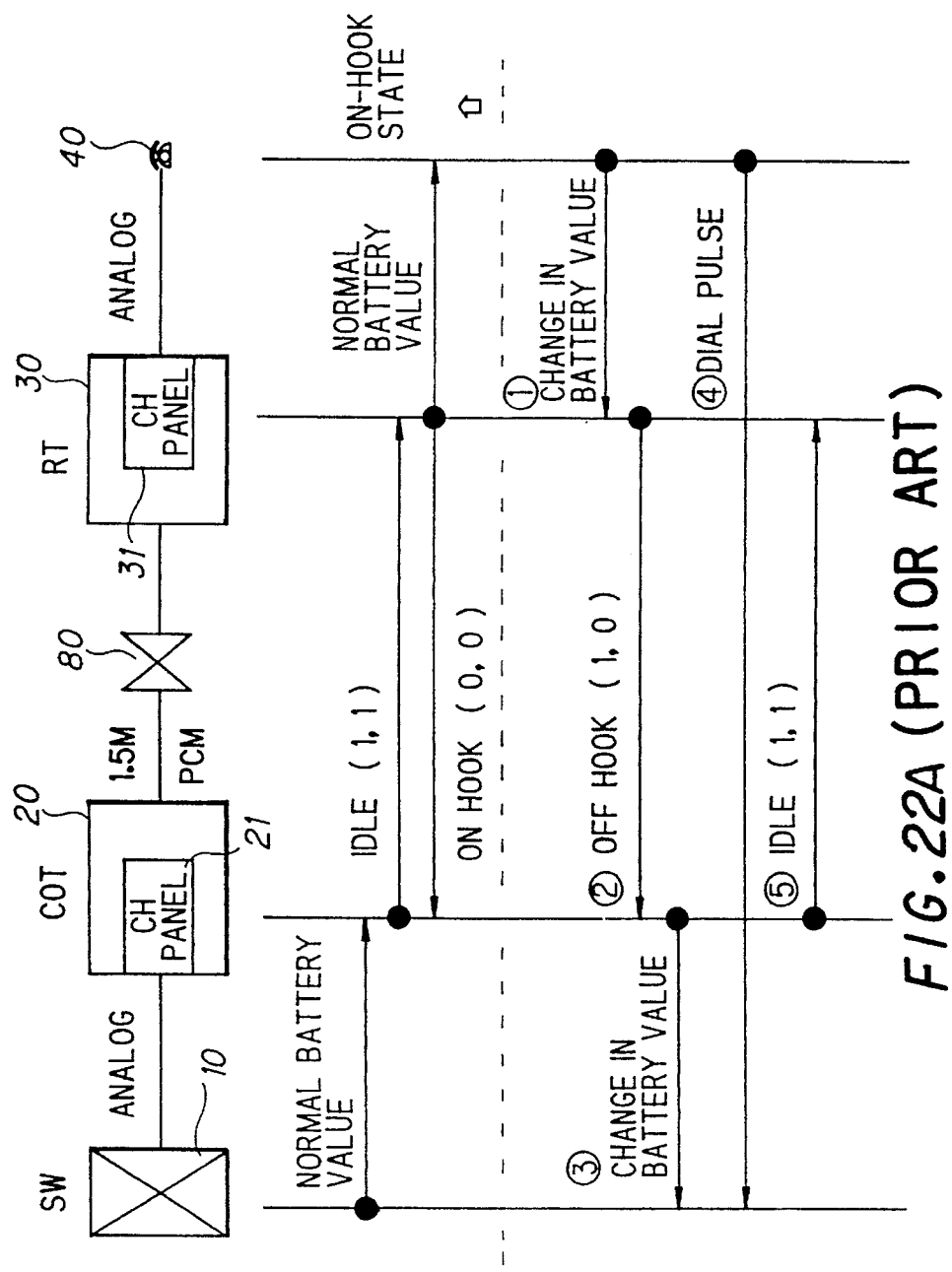
Figure 23:
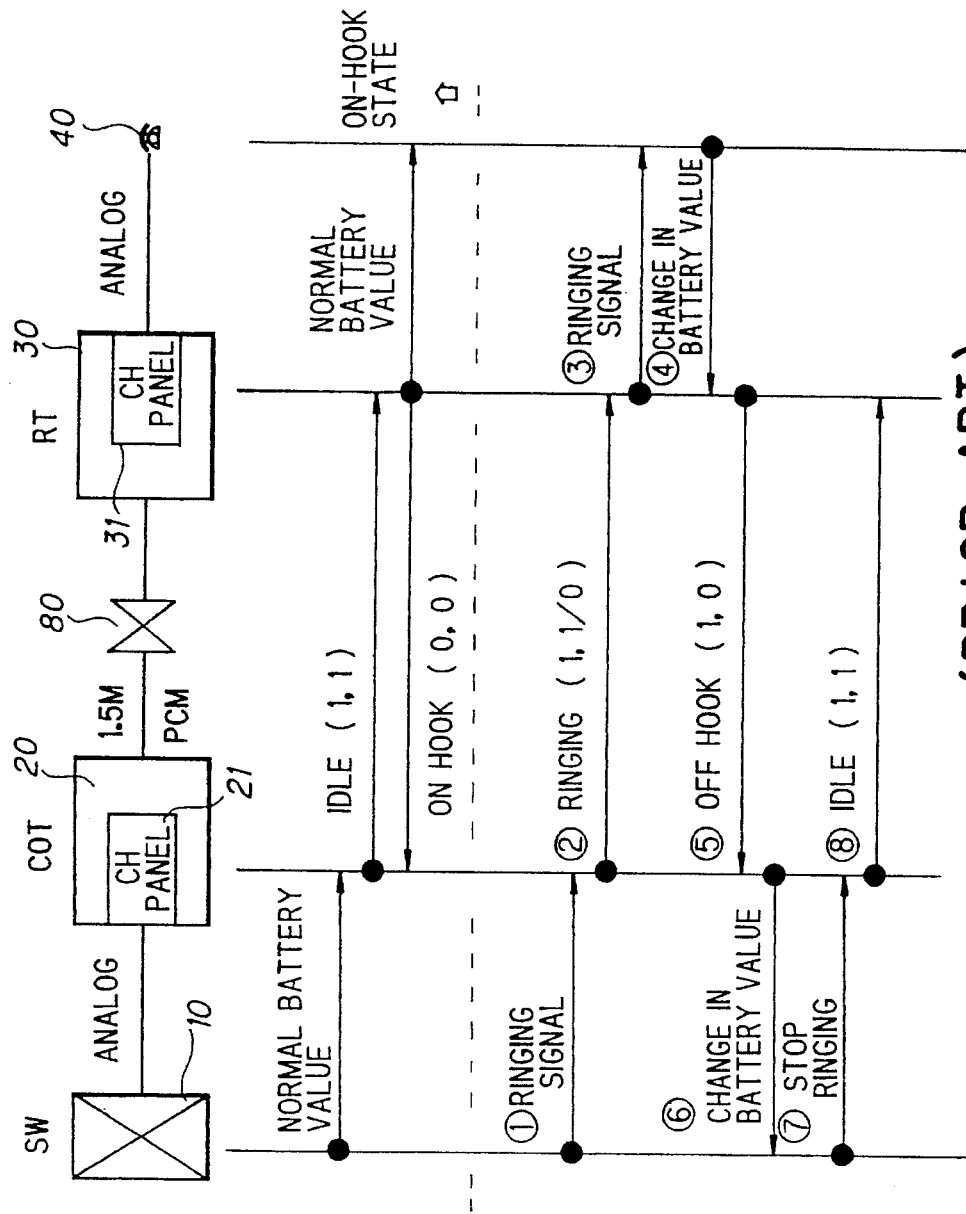
Figures 24, 24A:
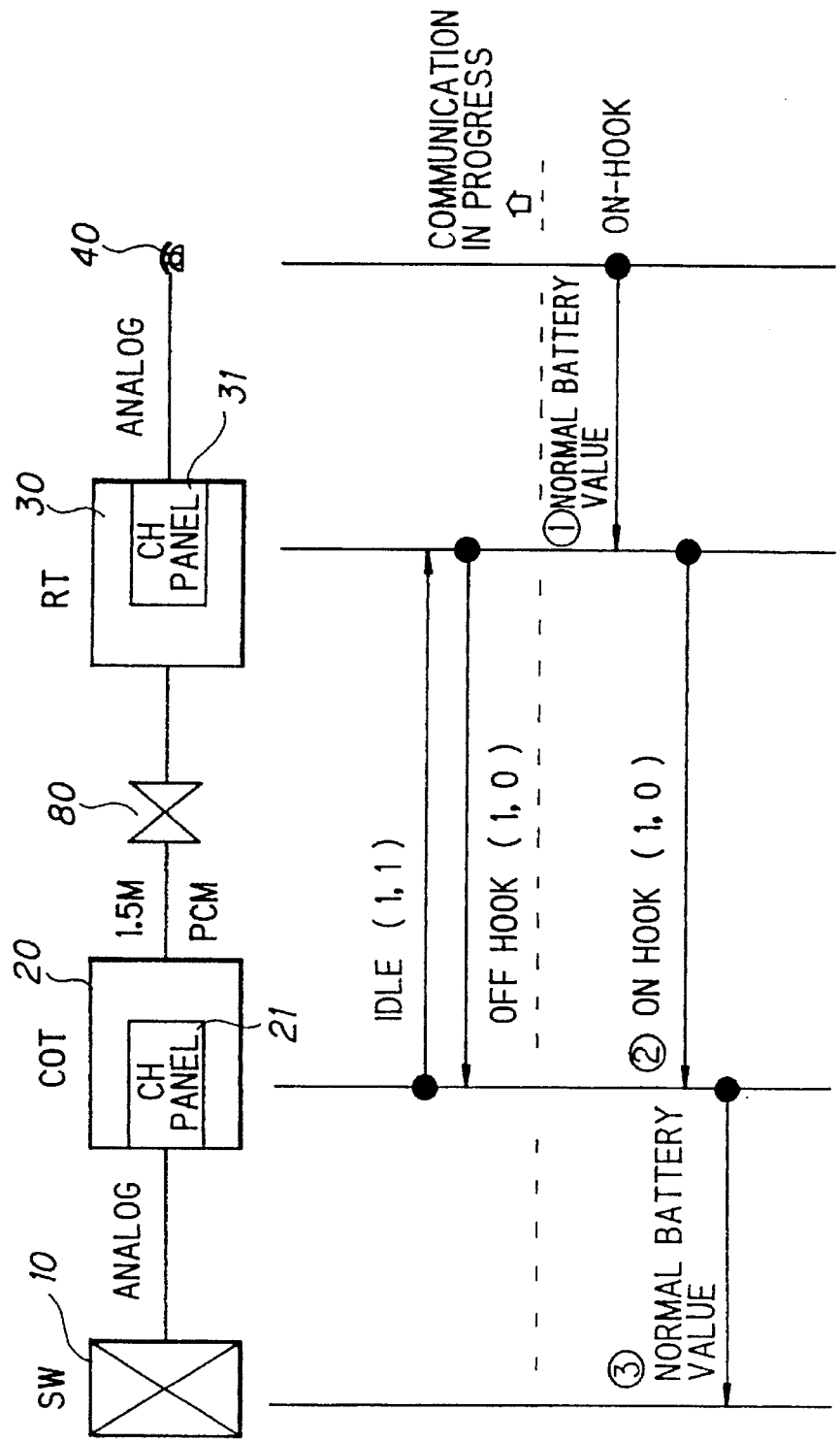
FIGS. 24 and 24A show a diagram for describing operation at the end of a conversation according to the prior art.

FIG. 3 is a block diagram illustrating the construction of the CH panel, in which components identical with those shown in FIG. 20 are designated by like reference characters and need not be described again. This arrangement differs from that of FIG. 20 in that, in terms of hardware, there are provided a path-connecting relay circuit APTR for an analog test and a path-connecting relay circuit DPTR for a digital-path test. Another difference is that, in terms of software, the CPU controls the relay circuits APTR, DPTR so as to connect test paths designated by the subscriber's line testing apparatus 200a, 200b.

Path-connecting relay circuit APTR for analog test;

The path-connecting relay circuit APTR for an analog test has relays R11–R16. Under the control of the CPU, appropriate relays are turned on and off to form a path CH TEST, which is for performing the analog test on the side of the CH panel, and a path SUB TEST, which is for performing the analog test on the subscriber side.

① At ordinary times, namely when a test is not being conducted, the relays R15, R16 are turned on and the other relays are turned off.

② In a case where a switch or subscriber's terminal is connected to the TIP/RING lines, the relays R15, R16 are turned off and the relays R11, R12 are turned on to form the path SUB TEST, which is for performing the analog test on the subscriber side, in order that an analog test may be conducted on the side of the switch or subscriber. Under these conditions, analog test signals from the subscriber's line testing apparatus 200a, 200b are sent to the switch or subscriber terminal via the test path SUB TEST, and answer signals are returned to these subscriber's line testing apparatus through the reverse routes to measure the signals by a measuring unit and performed testing. ③ Further, in a case where an analog test on the side of the CH panel is conducted, the relays R15, R16 are turned off and the relays R13, R14 are turned on to form the path CH TEST for the analog test on the side of the CH panel. At this time a path NE TEST, which is for conducting a digital test on the side of the CH panel, is formed in the path-connecting relay circuit DPTR for the digital test.

Under these conditions, the subscriber's line testing apparatus 200a, 200b input the analog test signal from the test path CH TEST to the CODEC via the analog circuitry on the side of the CH panel. The CODEC converts the analog signal into a digital signal and returns the digital signal to the subscriber's line testing apparatus 200a, 200b via the path NE TEST for the digital test on the side of the CH panel, as a result of which the test is conducted.

Path-connecting relay circuit DPTR for digital test;

The path-connecting relay circuit DPTR for a digital test has relays R21~R26. Under the control of the CPU, appropriate relays are turned on and off to form the path NE TEST, which is for performing the digital test on the side of the CH panel, and a path FE TEST, which is for performing the digital test on the side of the digital transmission line 400.

① At ordinary times, namely when a test is not being conducted, the relays R25, R26 are turned on and the other relays are turned of.

② In a case where a digital test on the side of the digital transmission line 400 is to be conducted, the relays R25, R26 are turned off and the relays R23, R24 are turned on to form the path FE TEST, which is for performing the digital test on the side of the transmission line. Under these conditions, a digital test signal from the subscriber's line testing apparatus 200a is sent to the side of the digital transmission line via the test path FE TEST to perform testing.

③ In a case where a digital test on the side of the CH panel is conducted, the relays R25, R26 are turned off and the relays R21, R22 are turned on to form the path NE TEST for the digital test on the side of the CH panel. At this time the relays R15, R16 of the path-connecting relay circuit APTR for the analog test are turned off and the relays R13, R14 are turned on to form the path CH TEST for the analog test on the side of the CH panel.

Under these conditions, the subscriber's line testing apparatus 200a, 200b input the digital test signal to the CODEC via the test path NE TEST. The CODEC converts the digital signal into an analog signal and returns the analog signal to the subscriber's line testing apparatus 200a, 200b via the path CH TEST for the analog test, as a result of which the test is conducted.

It should be noted that the CODEC corresponds to the coder/decoder 111a in FIG. 1, and that the combination of the path-connecting relay circuit APTR for the analog test and path-connecting relay circuit DPTR for the digital test corresponds to the test-path generator 112a in FIG. 1.

(b-3) Subscriber's line testing apparatus

Figure 4:
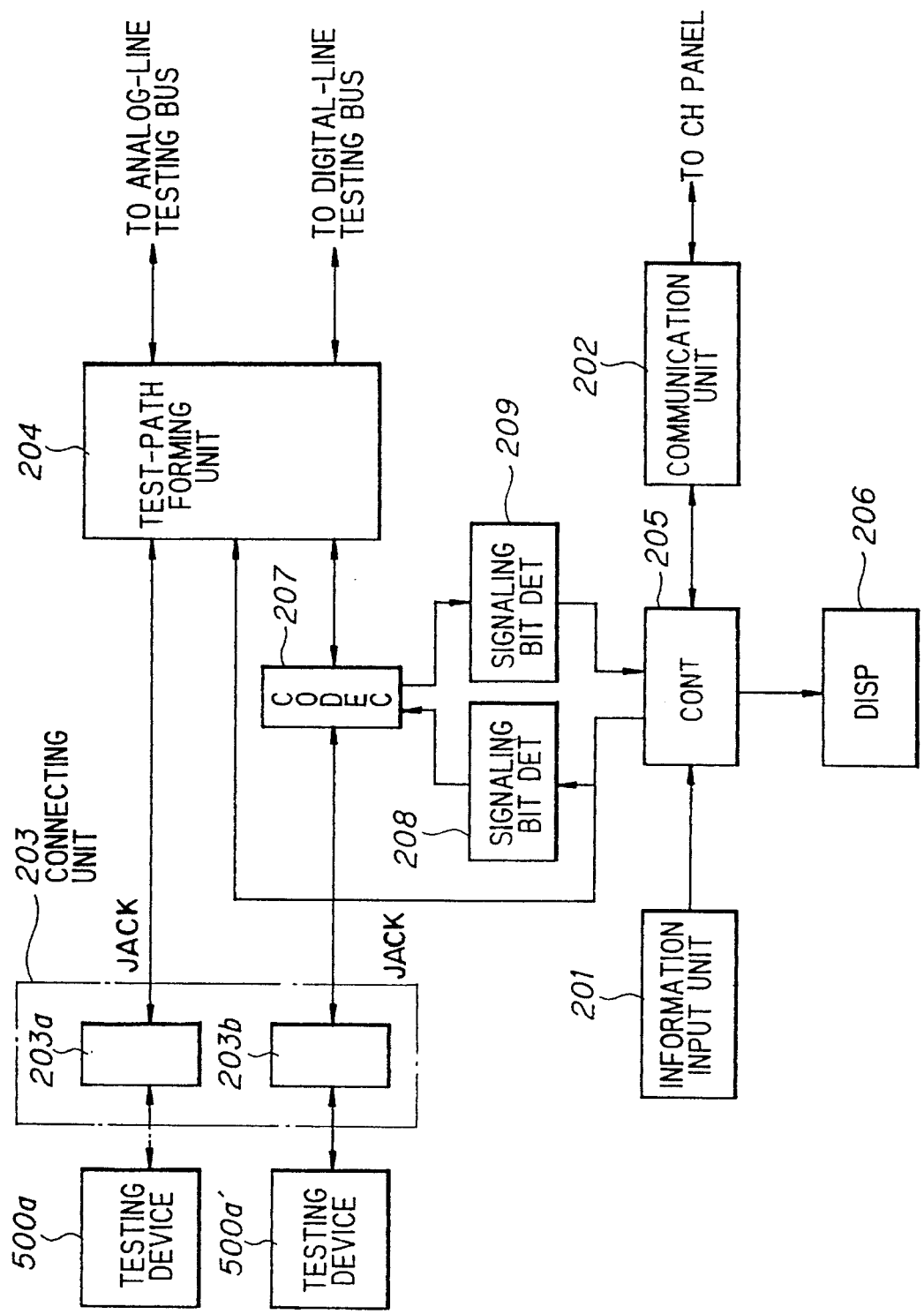
FIG. 4 is a block diagram showing the construction of a subscriber's line testing apparatus according to the invention.

FIG. 4 is a block diagram showing the construction of a subscriber's line testing apparatus according to an embodiment of the invention.

The information input unit 201 enters ① the number identifying the subscriber's circuit (CH panel) to be tested, ② the information specifying the test path (the analog test paths CH TEST, SUB TEST and the digital test paths NE TEST, FE TEST in FIG. 3), and ③ the test mode that uses the signaling bit (i.e., the distinction among an operation test in the on-hook state, an operation test at the time of an outgoing call, an operation test at the time of an incoming call and an operation test at the end of a conversation). The communication unit 202 sends the test-path specifying information to a specified subscriber's circuit (CH panel). The connecting unit 203 connects the analog testing units 500a, 500a' that test the subscriber's lines. The unit 203 has first and second jacks 203a, 203b.

The test-path forming unit 204 on the side of the testing apparatus inputs a test signal from the testing devices 500a, 500a' to a test path of the specified subscriber's circuit (CH panel) and inputs a signal, which arrives via the test path, to the testing device 500a or 500a'. The unit 204 is constituted by relay circuitry.

The controller 205 controls the overall testing apparatus, and the display unit 206 displays the identification number of the subscriber's circuit, the state of the test, the content of a received signaling bit, etc. The signaling bit is composed of two bits, namely the A and B bits, as mentioned above. A "1" signaling bit lights an LED, a "0" bits extinguishes the LED, and "alternating 1/0" flashes the LED.

A coder/decoder 207 converts an analog signal, which has entered from the analog testing device 500a' via the jack 203b, into a digital signal and outputs the digital signal upon inserting a signaling bit. Further, the coder/decoder 207 extracts a signaling bit from a digital answer signal, which has entered via the test-path forming unit 204, converts the digital signal into an analog signal and inputs the analog signal to the analog testing device 500a'. By providing the coder/decoder 207, only an analog testing device need be used as the testing device.

A signaling-bit generator 208 generates a signaling bit, which is inserted in the digital signal, in accordance with a command from the controller 205, and a signaling-bit detector 209 detects the signaling bit and inputs the bit to the controller 205.

The controller 205 ① sends a test request to a specified subscriber's circuit (CH panel) via the communication unit 202 when various information is entered from the information input unit 201, ② forms a test path by means of the test-path forming unit 204 after verifying a "test OK" response from the subscriber's circuit, and ③ and sends test-path specifying information from the communication unit 202 to the subscriber's circuit, thereby generating a test path on the side of the communication system. Further, on the basis of an operation-verifying test mode using a signaling bit, ④ the controller 205 causes the signaling-bit generator 208 to generate a prescribed signaling bit and ⑤ inputs the content of the signaling bit, which has been detected by the signaling-bit detector 209, as well as the number of the subscriber's circuit being tested and the status of the test, to the display unit, whereby this information is displayed.

Figure 5:
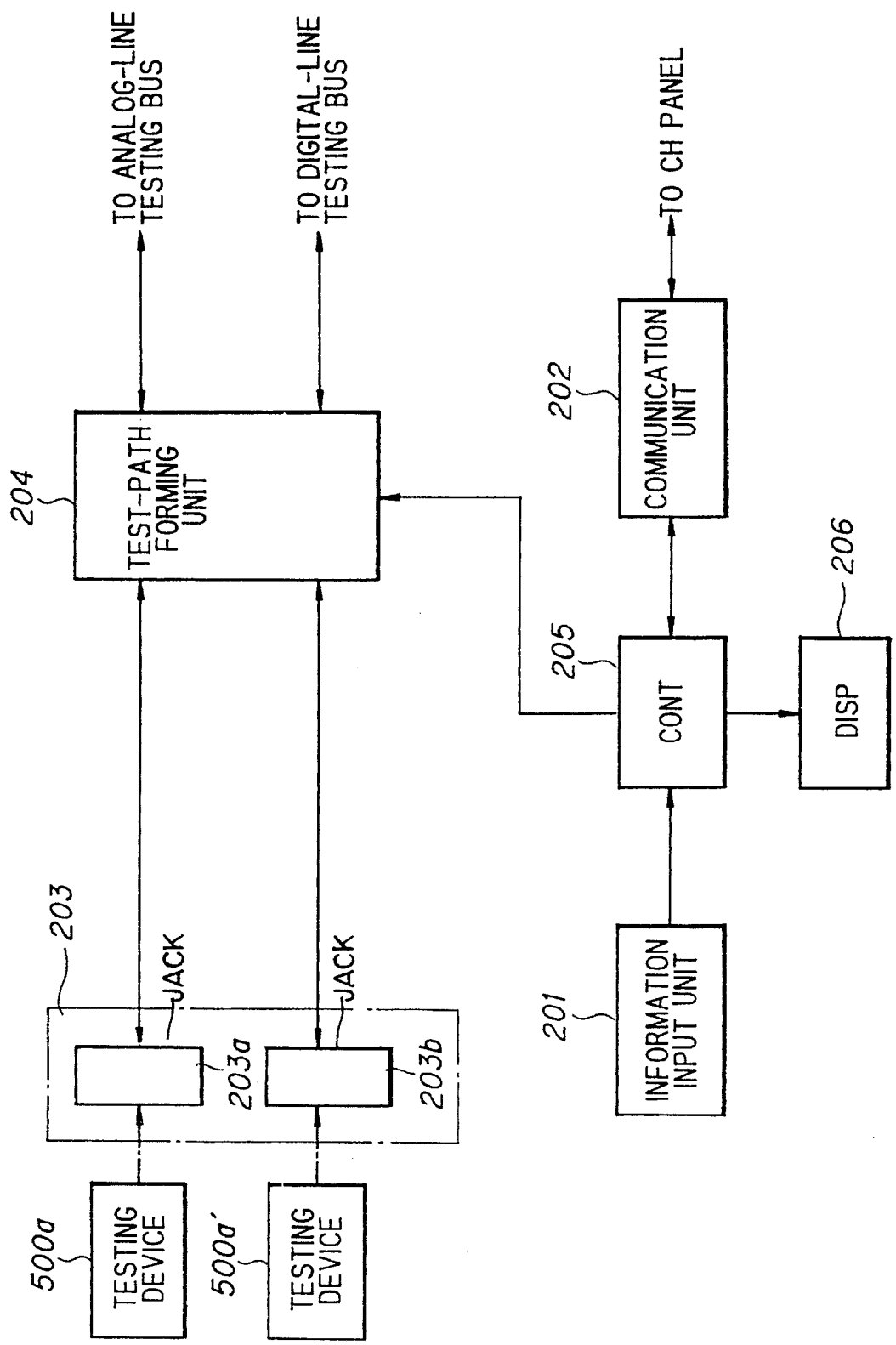
FIG. 5 is another block diagram showing the construction of a subscriber's line testing apparatus according to the invention.

FIG. 5 is another block diagram showing the construction of a subscriber's line testing apparatus according to the invention. In the example of FIG. 4, it suffices for an analog testing device to be provided as the testing device. However, in a case where both the analog testing device 500a and digital testing device 500a' are used, the coder/decoder, the signaling-bit generator and the signaling-bit detector may be dispensed with, as shown in FIG. 5.

(b-4) Overall test path

Figure 6:
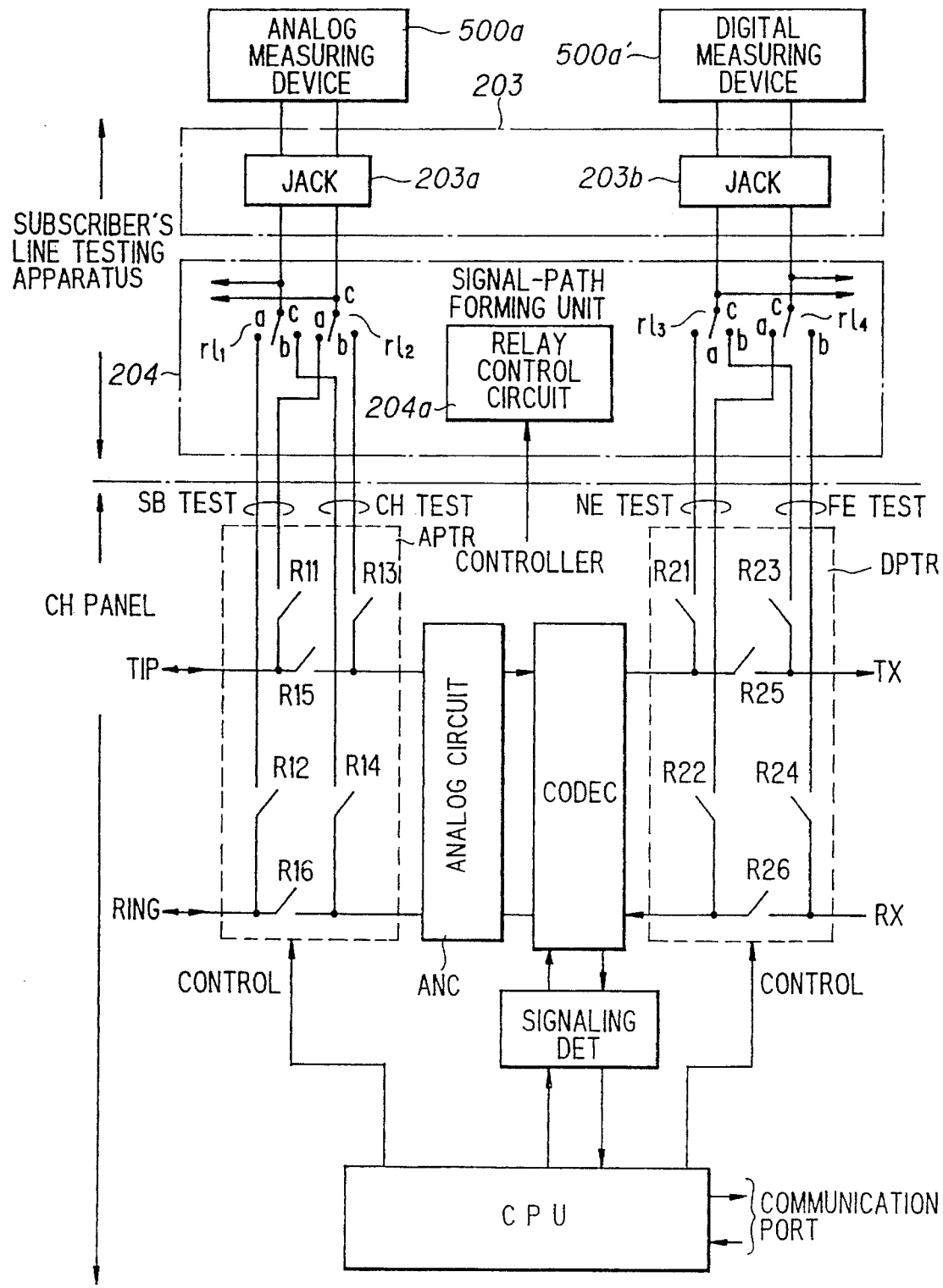
FIG. 6 is a diagram for describing the entirety of a test path.

FIG. 6 is a diagram for describing the entirety of a test path. This is an example in which the analog testing unit 500a and digital testing device 500a' are connected as measuring units. Two analog test lines from the analog testing device 500a enter the signal-path forming unit 204 via the jack 203a, and two digital test lines from the digital testing device 500a' enter the signal-path forming unit 204 via the jack 203b.

The two analog test lines are connected to common terminals c of relay contacts $rl_1$, $rl_2$ provided in correspondence with each CH panel (only the relay contacts of one CH panel are shown in FIG. 6). Similarly, the two digital test lines are connected to common terminals c of relay contacts $rl_3$, $rl_4$ provided in correspondence with each CH panel (only the relay contacts of one CH panel are shown in FIG. 6). The a terminals of the relay contacts $rl_1$, $rl_2$ are connected to the path SUB TEST for the subscriber's side analog test of the CH panel, and the b terminals of the relay contacts $rl_1$, $rl_2$ are connected to the path CH TEST for the subscriber's side analog test of the CH panel. Further, the a terminals of the relay contacts $rl_3$, $rl_4$ are connected to the path NE TEST for the digital test on the side of the CH panel, and the b terminals of the relay contacts $rl_3$, $rl_4$ are connected to the path FE TEST for the digital test on the side of the digital line transmission.

③ In a case where a switch or subscriber's terminal has been connected to the TIP/RING lines, the controller 205 controls a relay control circuit 204a of the signal-path forming unit 204 to connect the relay contacts $rl_1$, $rl_2$ to the side of the a terminals when test-path specifying information for performing the analog test on the side of the switch or on the subscriber's side enters from the information input unit 201. Further, the controller 205 inputs the test-path specifying information to the CPU of the channel panel via the communication unit 202, as a result of which the relays R15, R16 are turned off and the relays R11, R12 are turned on under the control of the CPU to form the path SUB TEST for the analog test on the subscriber's side. As a result, the two analog signal lines from the analog testing device 500a are connected to the switch or subscriber's terminal to make the analog test possible.

② Further, when test-path specifying information for conducting a test on the side of the analog circuitry enters from the information input unit 201, the controller 205 controls the relay control circuit 204a of the test-path forming unit 204 to connect the relay contacts $rl_1$, $rl_2$ to the side of the b terminals and connect the relay contacts $rl_3$, $rl_4$ to the side of the a terminals. Further, the controller 205 inputs test-path specifying information to the CPU of the channel panel via the communication unit 202, as a result of which the relays R15, R16 are turned off and the relays R13, R14 are turned on under the control of the CPU to form the path CH TEST for the analog test on the side of the CH panel. In addition, the relays R25, R26 are turned off and the relays R21, R22 are turned on to form the path NE TEST for the digital test on the side of the CH panel.

As a result, the two test lines from the analog testing device 500a are connected to the CODEC via an analog circuit ANC (2W/4W, TX AMP, etc., in FIG. 3). The CODEC performs an A/D conversion and the digital signals resulting from the A/D conversion enter the digital testing device 500a', whereby a test on the side of the analog circuitry can be conducted. It should be noted that if the digital testing device 500a' transmits a digital test signal, the CODEC performs a D/A conversion and the analog signals resulting from the D/A conversion enters the analog testing device 500a through a route that is the reverse of that mentioned above, a digital test can be conducted.

③ Furthermore, when test-path specifying information for conducting a digital test on the side of the digital transmission line enters from the information input unit 201, the controller 205 controls the relay control circuit 204a of the test-path forming unit 204 to connect the relay contacts $rl_3$, $rl_4$ to the side of the b terminals. Further, the controller 205 inputs test-path specifying information to the CPU of the channel panel via the communication input unit 202, as a result of which the relays R25, R26 are turned off and the relays R23, R24 are turned on under the control of the CPU to form the path FE TEST for the digital test on the side of the digital transmission line. Under these conditions, a test is conducted by sending the digital test signal from the digital testing device 500a' to the side of the digital transmission line via the test path FE TEST.

It should be noted that in the case of the subscriber's line testing apparatus shown in FIG. 4, the analog testing device is connected to the jack 203b and the coder/decoder 207 is connected to the test-path forming unit 204.

(b-5) General features of subscriber's line test

Figure 7:
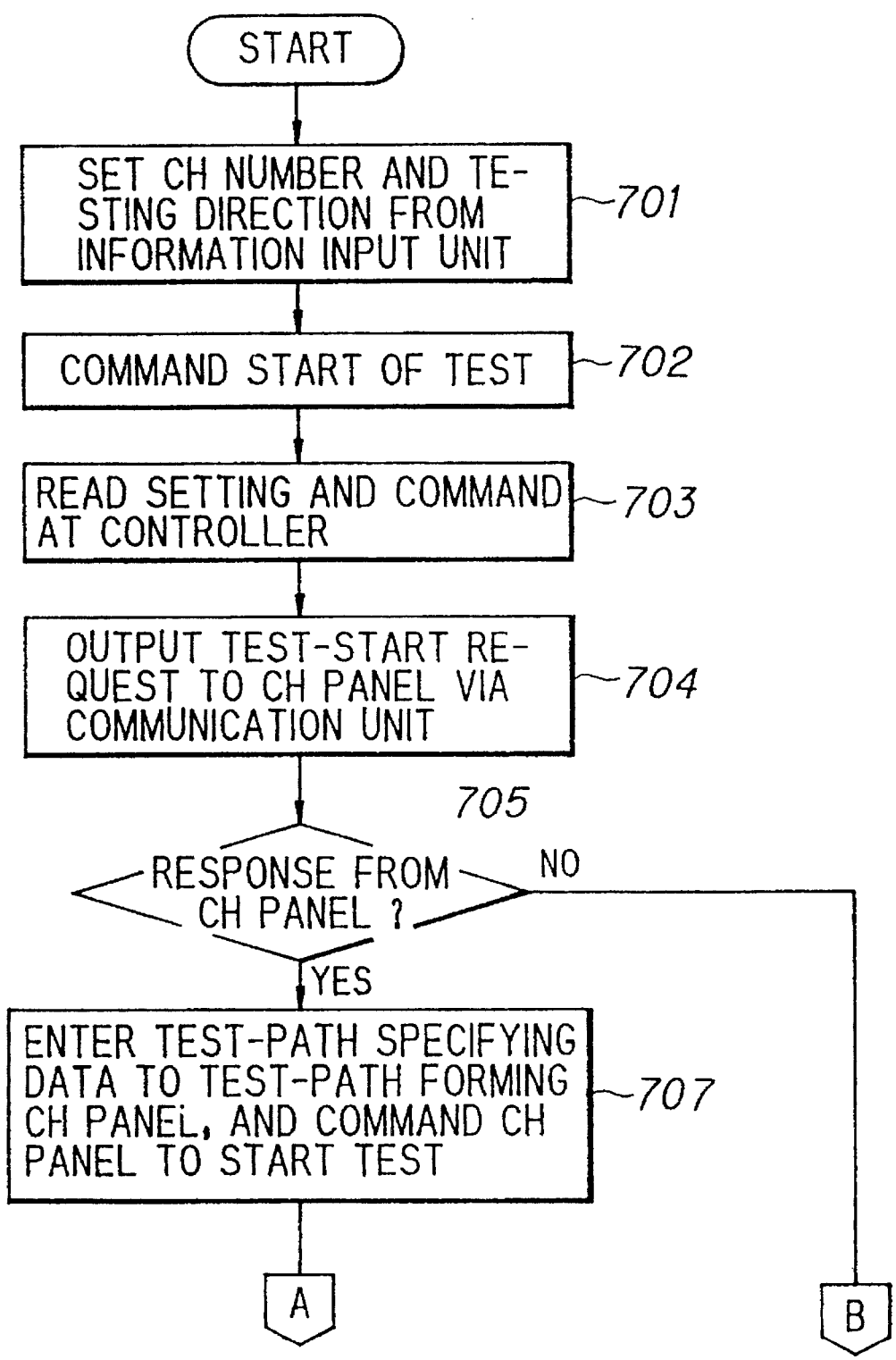
FIG. 7 is a flowchart (part 1) illustrating the general features of a subscriber's line test.
Figure 8:
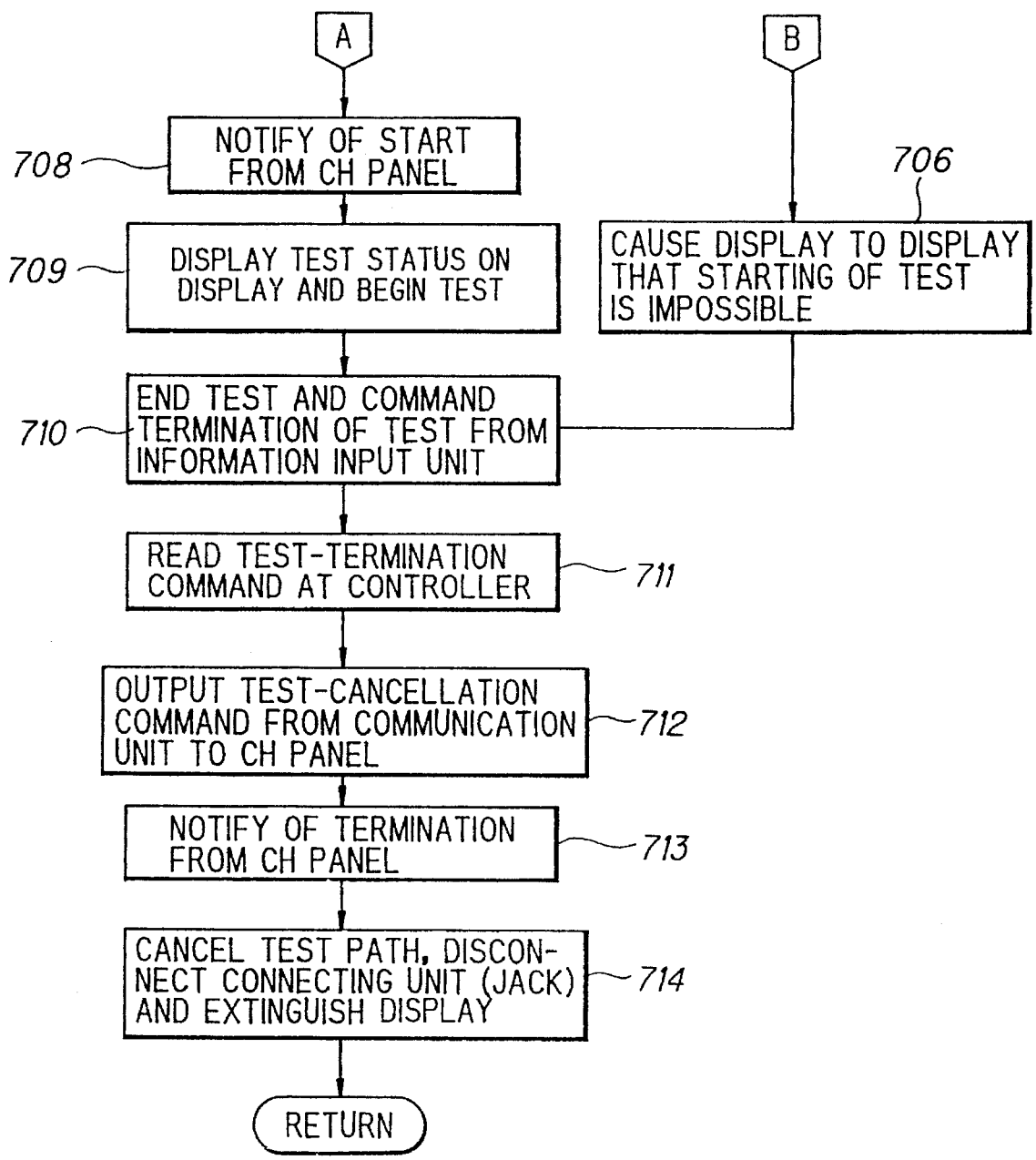
FIG. 8 is a flowchart (part 2) illustrating the general features of a subscriber's line test.

FIGS. 7 and 8 are flowcharts illustrating the general features of control for implementing the test of subscriber's lines.

After the number identifying the subscriber's circuit (CH panel) to be tested and the test-path specifying information (the testing direction) are entered from the information input unit 201, a testing command is issued (steps 701, 702). When this is done, the controller 205 reads these items of information as well as the command (step 703) and sends a specified CH panel a test starting request via the communication unit 202 (step 704).

Upon receiving the test starting request, the CPU of the CH panel sends back an answer signal, which indicates that testing is possible, if communication is not currently in progress. If communication is in progress, the CPU sends back an answer signal indicating that testing is not possible. The controller 205 receives the answer signal via the communication unit 202 and, on the basis of the answer signal, judges whether testing is possible or not (step 705).

If testing is not possible, then a display to this effect is presented on the display unit 206 (step 706). If testing is possible, however, the test-path forming unit 204 is controlled based upon the test-path specifying data so as to form a test path on the side of the testing apparatus 200. Further, a signal indicating initiation of the test is sent to the CH panel along with the test-path specifying data via the communication unit 202, thereby forming a test path (step 707). Upon receiving notification of test initiation from the CH panel following setting of the test path (step 708), the controller 205 causes the display unit 206 to display that testing is in effect and then begins conducting the test (step 709).

Testing is subsequently carried out. When testing is concluded, the information input unit 201 commands termination of testing (step 710) and the controller 205 reads this command (step 711) so that a termination command is sent from the communication unit 202 to the CH panel (step 712). Upon receiving notification of termination from the CH panel (step 713), the controller 205 cancels the test path of the test-path forming unit 204 (places the relay terminals in their initial states), disconnects the connecting unit 203 from the test path and extinguishes the display on the display unit (step 714).

(b-6) Principal measuring units used to test subscriber's lines

A measuring device for an analog test and a measuring device for a digital test are available as measuring devices. The former further includes a device for measuring analog-signal characteristics and a device for measuring signaling characteristics. The following devices are available on the market as measuring devices for measuring analog-signal characteristics (the characteristics of these units are as indicated):

HP3779D: manufactured by Hewlett Packard; can be used to measure IDLE channel noise, frequency response characteristic, etc;

HP4945A: manufactured by Hewlett Packard; can be used to measure return loss, impulse noise, etc;

Wilcom T-207: Manufactured by Wilcom; can be used to measure longitudinal balance.

A unit which may be used to measure signaling characteristics is the Wiltron 9361B (manufactured by Wiltron). This unit has dummy switch and telephone functions for producing originating and terminating states on a line, outputting a ringing signal, outputting dial pulses, etc.

The following devices are available on the market as measuring devices for digital testing (the characteristics of these devices are as indicated):

MS369B: Manufactured by Anritsu; capable of outputting an analog test signal and receiving a digital signal and of outputting a digital test signal and receiving an analog signal; can be used in testing the CODEC of the CH panel;

HP3787B: manufactured by Hewlett Packard; capable of inputting/outputting digital signals at a rate of 64 Kbit/s; can be used in a case where a digital data line is tested, rather than as an ordinary telephone line, as in measuring error rate, testing loop-back of digital data, etc.

(b-7) Various tests

② Testing of line laid between switch and DLC [DLC(COT)] on switch side

Figure 9:
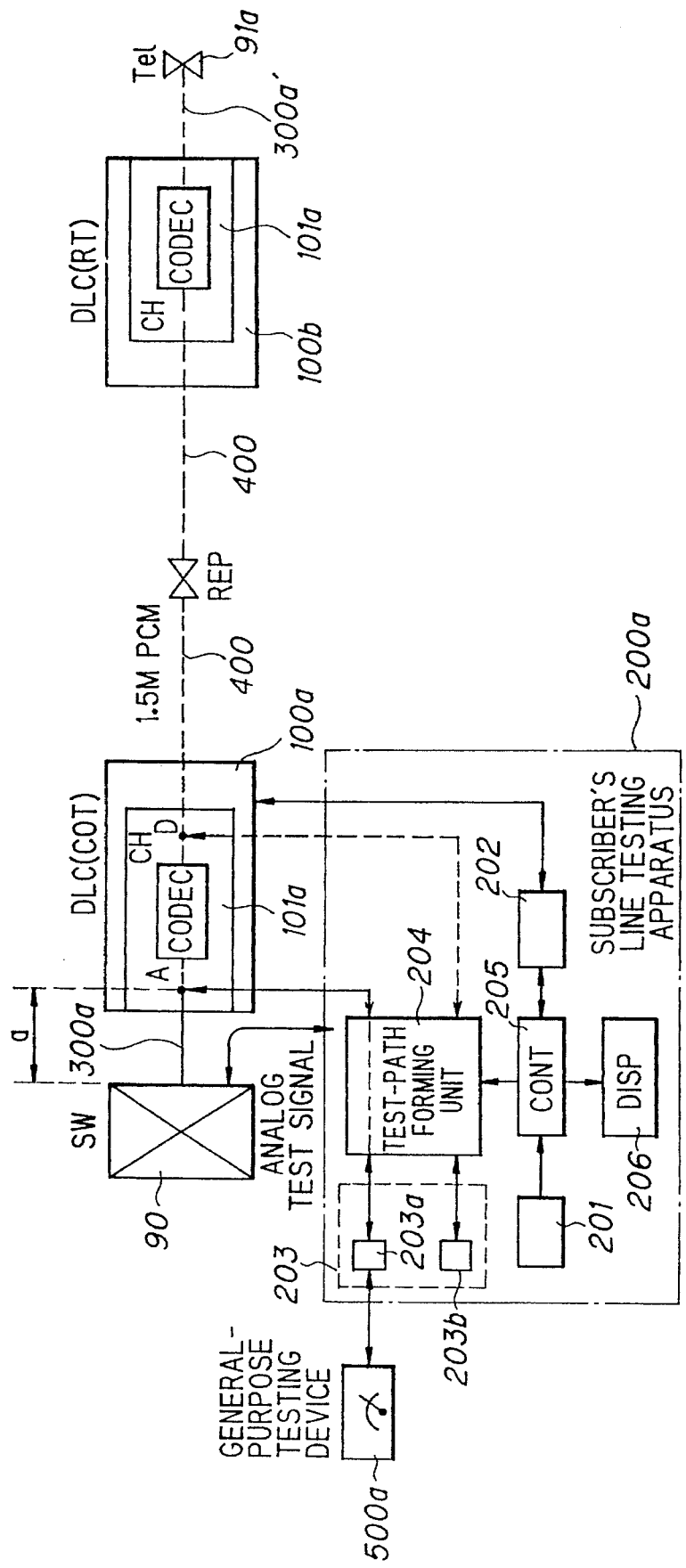
FIG. 9 a diagram for describing testing of a line between a switch and a DLC on the switch side.

FIG. 9 a diagram for describing testing of a line between a switch and the DLC [DLC(COT)] on the switch side. It should be noted that the forming of an actual signal path has already been described in connection with FIG. 6 and need not be described again.

The test-path forming unit 204 is connected to an analog point A of a subscriber's line in the CH panel 101a of the DLC 100a on the switch side, and the analog general-purpose testing device 500a is connected to the jack 203a. As a result, the switch 90 and testing device 500a are interconnected. This means that verification of a line laid between the switch 90 and the DLC 100a on the switch side is performed by passing a test signal between these two units and then judging whether the laid line is faulty or not. For example, access is gained from the testing apparatus 200a, which sends a signal to the switch 90. If a response is received from the switch, this is regarded as indicating a connection. Further, the signal level from the switch 90 is checked to see whether it is at a stipulated value.

② Operation-verifying test of CH panel in DLC (COT)

Figure 10:
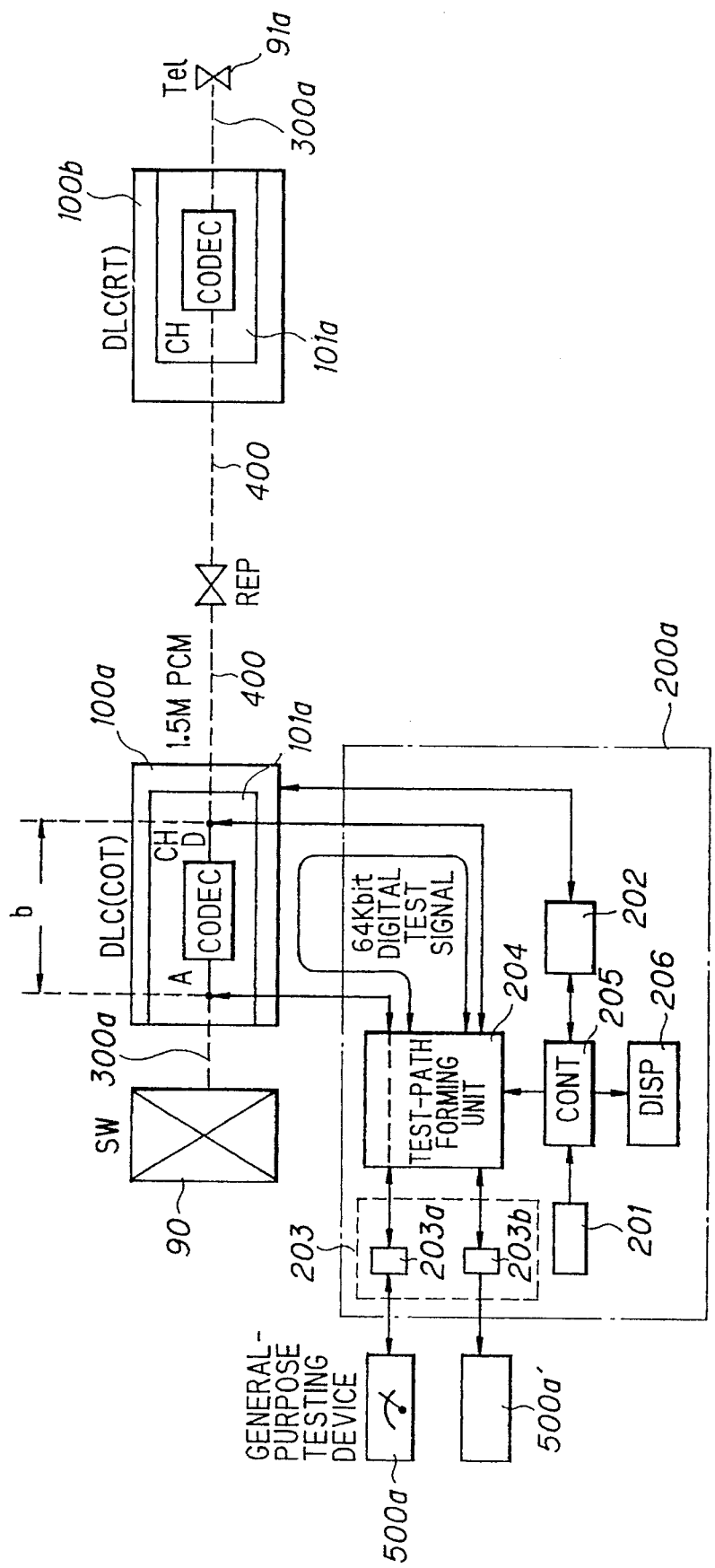
FIG. 10 is a diagram for describing an operation-verifying test of the CH panel in a DLC.

FIG. 10 is a diagram for describing an operation-verifying test of the CH panel 101a in the DLC 100a on the switch side.

The test-path forming unit 204 is connected simultaneously to both an analog point A and a digital point D of a subscriber's line in the CH panel 101a, and the digital general-purpose testing device 500a' is connected to the jack 203b. As a result, the analog testing unit and the digital testing device are interconnected via the CH panel 101a. The analog testing device 500a issues an analog test signal, the CODEC of the CH panel 101a converts the analog test signal into a digital signal, and the resulting digital signal is received by the digital testing unit 500a', whereby verification of the operation of the CH panel is performed.

Conversely, the digital testing unit 500a' issues a digital test signal, the CODEC of the CH panel 101a converts the digital test signal into an analog signal, and the resulting analog signal is received by the analog testing unit 500a, whereby verification of the operation of the CH panel is performed.

It should be noted that the operation-verification test of the CH panel can be conducted in similar fashion also with regard to the DLC(RT) on the terminal side.

③ Testing of line laid between switch and DLC [DLC(RT)] on terminal side

Figure 11:
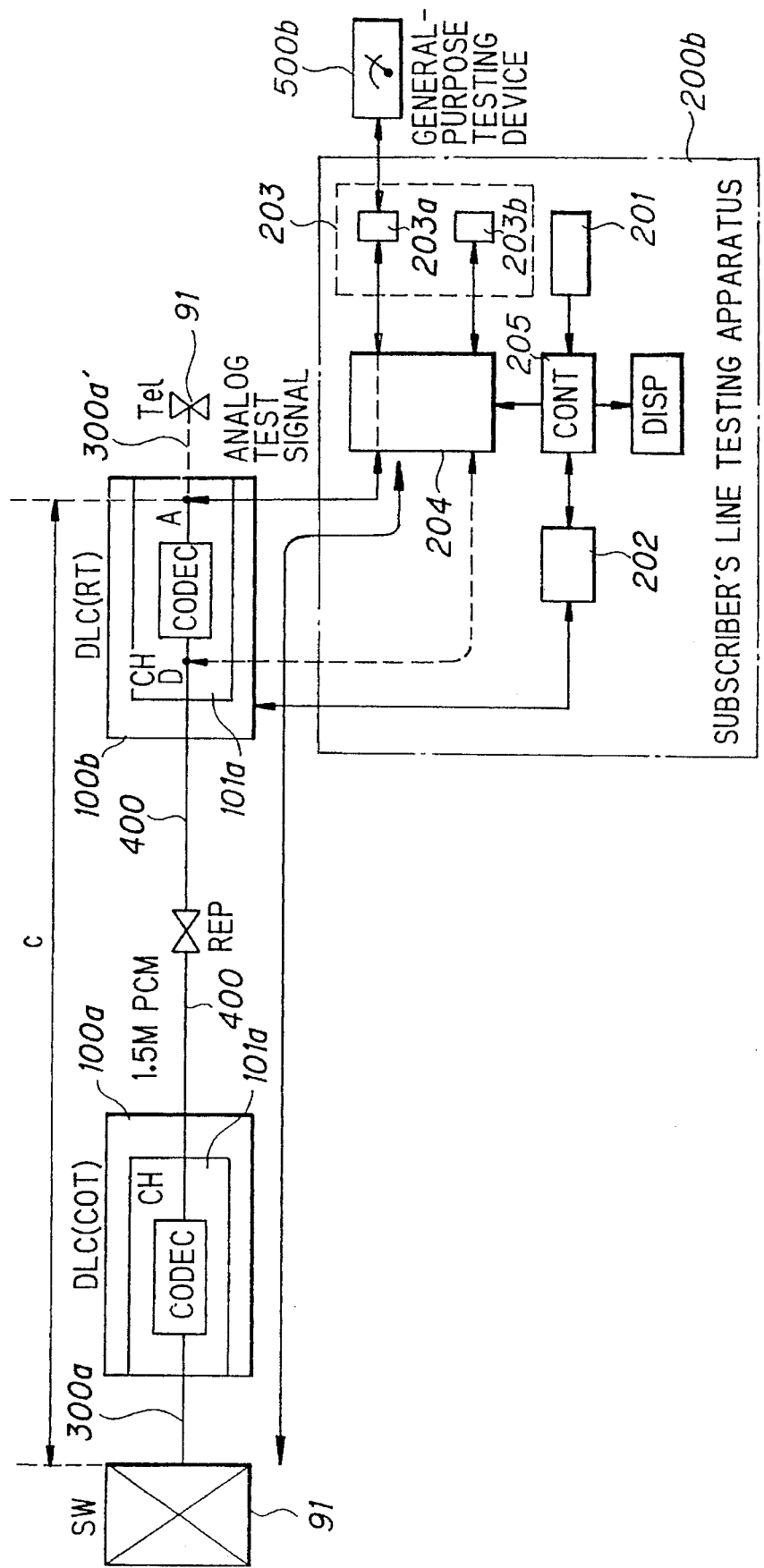
FIG. 11 a diagram for describing testing of a line between a switch and a DLC on a terminal side.

FIG. 11 a diagram for describing testing of a line between a switch and the DLC [DLC(RT)] on the terminal side.

The test-path forming unit 204 is connected to the analog point A of the subscriber's line in the CH panel 101a of the DLC 100b on the terminal side, and the analog general-purpose testing unit 500b is connected to the jack 203a. As a result, testing unit 500a and the switch 90 are interconnected. This means that verification of a line laid between the switch 90 and the DLC 100b on the terminal side is performed by passing a test signal between these two units and then judging whether the laid line is faulty or not. For example, access is gained from the testing apparatus 200b, which sends a signal to the switch 90. If a response is received from the switch, this is regarded as indicating a connection. Further, the signal level from the switch 90 is checked to see whether it is at a stipulated value.

Figure 12:
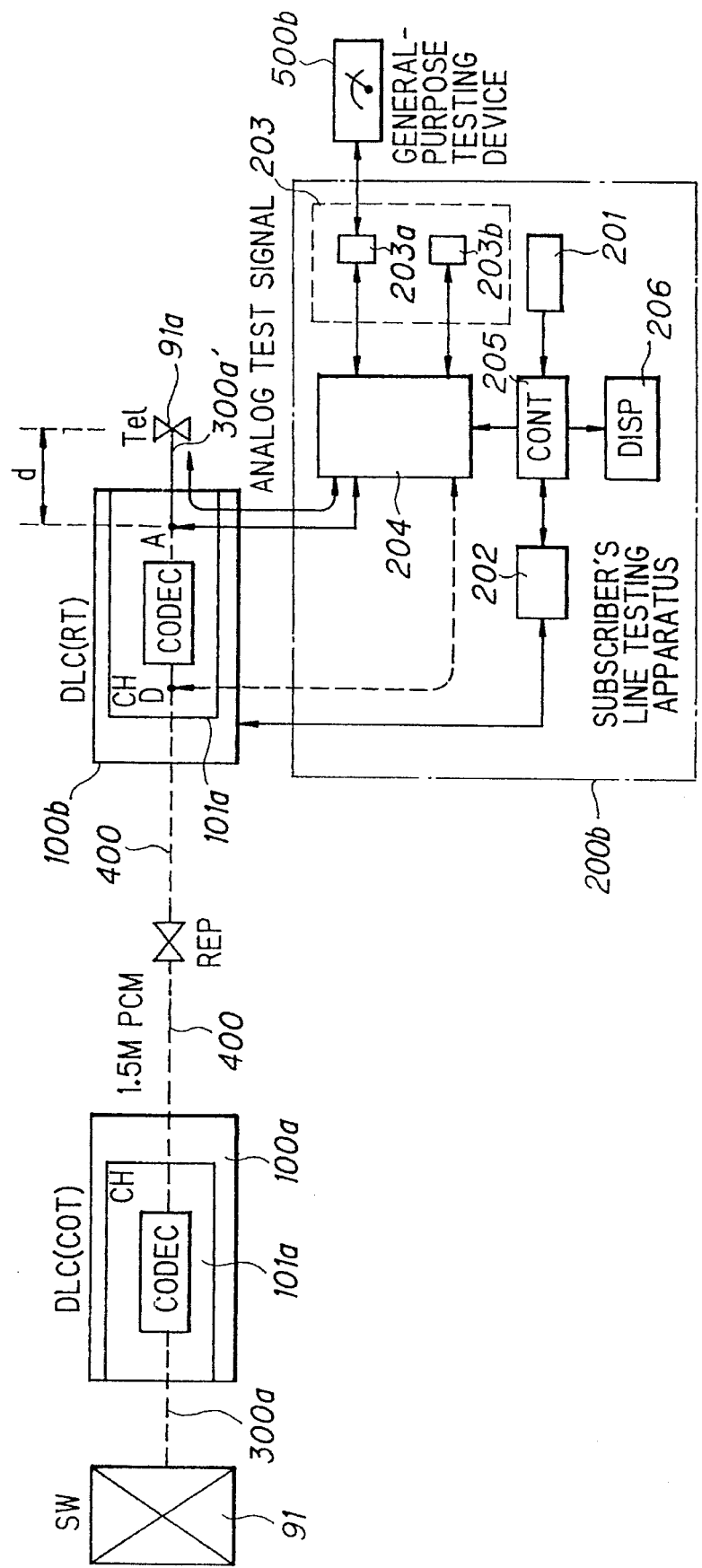
FIG. 12 a diagram for describing testing of a line between a DLC on a terminal side and a subscriber's terminal.

④ Testing of line laid between DLC [DLC(RT)] on terminal side and subscriber's terminal FIG. 12 a diagram for describing testing of a line between the DLC [DLC(RT)] on the terminal side and the subscriber's terminal. The test-path forming unit 204 is connected to the analog point A of the subscriber's line in the CH panel 101a of the DLC 100b on the terminal side, and the analog general-purpose testing device 500b is connected to the jack 203a. As a result, a subscriber's terminal 91a and testing unit 500b are interconnected. This means that verification of a line laid between the subscriber's terminal 91a and the DLC 100b on the terminal side is performed by passing a test signal between these two units and then judging whether the laid line is faulty or not. For example, access is gained from the testing apparatus 200b, which sends a signal to the subscriber's terminal 91a. If a response is received from the subscriber's terminal 91a, this is regarded as indicating a connection. Further, the signal level from the subscriber's terminal 91a is checked to see whether it is at a stipulated value.

⑤ Fault cutting-and-dividing test

Figure 13:
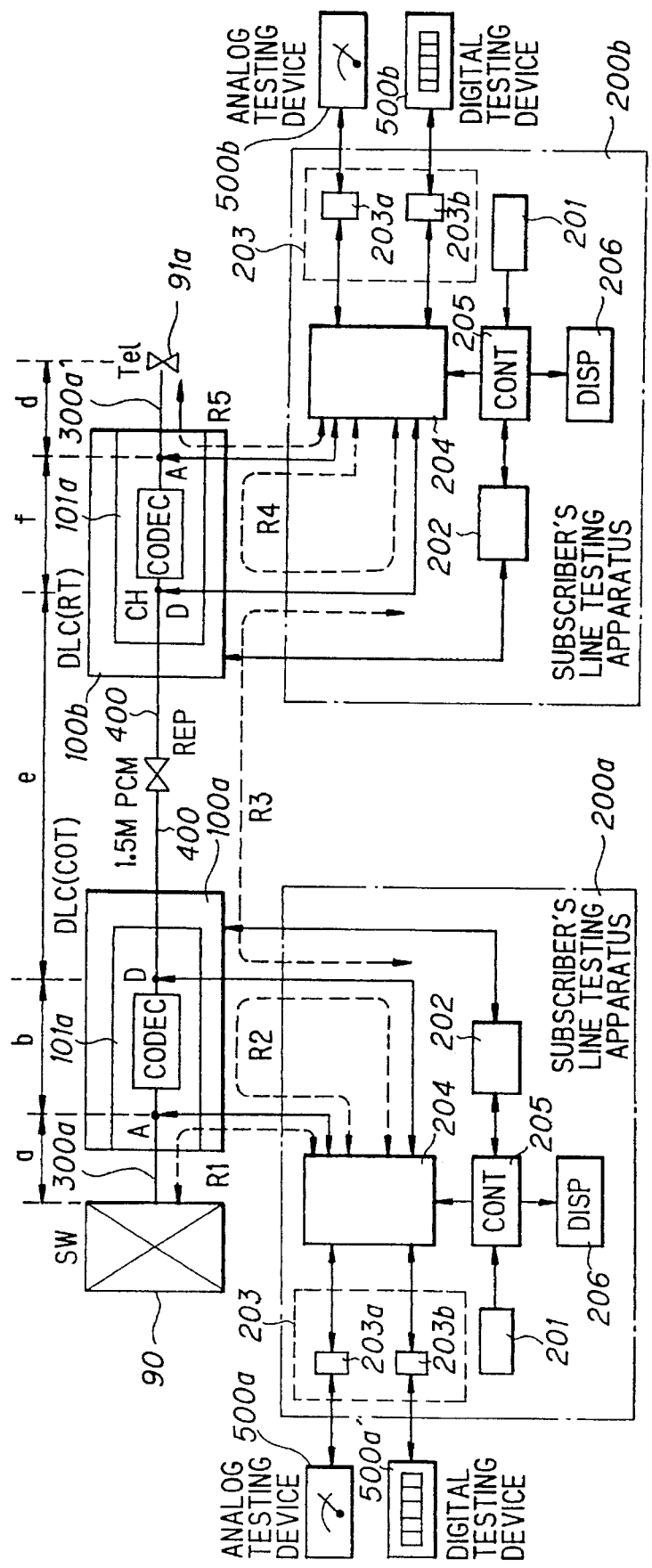
FIG. 13 is a diagram for describing a fault cutting-and-dividing test.

FIG. 13 is a diagram for describing a fault cutting-and-dividing test. In FIG. 13, a, b, e, f, d indicate fault cutting-and-dividing intervals. With regard to the testing of intervals a, b, f, d, the methods described in connection with FIGS. 9~12 are employed.

With regard to the testing of the line laid in interval e, the test-path forming units 204, 204 of the subscriber's line testing apparatus 200a, 200b are connected simultaneously to a digital access point D in each of the CH panels 101a, 101a in the switch-side DLC 100a and terminal-side DLC 100b. Further, the digital testing devices 500a', 500b' are connected to the jacks 203b, 203b of the subscriber's line testing apparatus 200a, 200b, respectively. As a result, the digital testing devices 500a', 500b' on the switch and terminal sides are interconnected via the digital transmission line 400. Therefore, testing of the digital transmission line to determine whether it has been laid properly can be performed by sending a digital signal from one testing device and receiving it at the other testing device.

(b-8) Test using signaling bit

Basically, a test using a signaling bit involves connecting the testing device to the digital access point D of a CH panel via the subscriber's line testing apparatus, transmitting a test signal from the testing device upon inserting a specific signaling bit, and using the testing device to monitor a signaling bit that is in response to the transmitting signaling bit, thereby judging whether the telephone line is normal or not. With the arrangement of FIG. 4 in which the digital testing device is not used, the test is performed by having the controller 205 control the signaling-bit generator 208 based upon the type of signal-bit test entered from the information input unit 201, whereby the signaling-bit generator is made to generate a prescribed signaling bit, inserting this signaling bit in a digital signal and then transmitting the digital signal using the coder/decoder 207, detecting a response signaling bit by the signaling-bit detector 209, inputting this signaling bit to the controller and displaying it on the display unit 206. A verification operation will now be described, in which the operation uses a signaling bit when the line is in the on-hook state, at the time of an outgoing call, at the time of an incoming call and at the end of a conversation. The subscriber's line testing apparatus is not illustrated in FIGS. 14–17.

Figure 14:
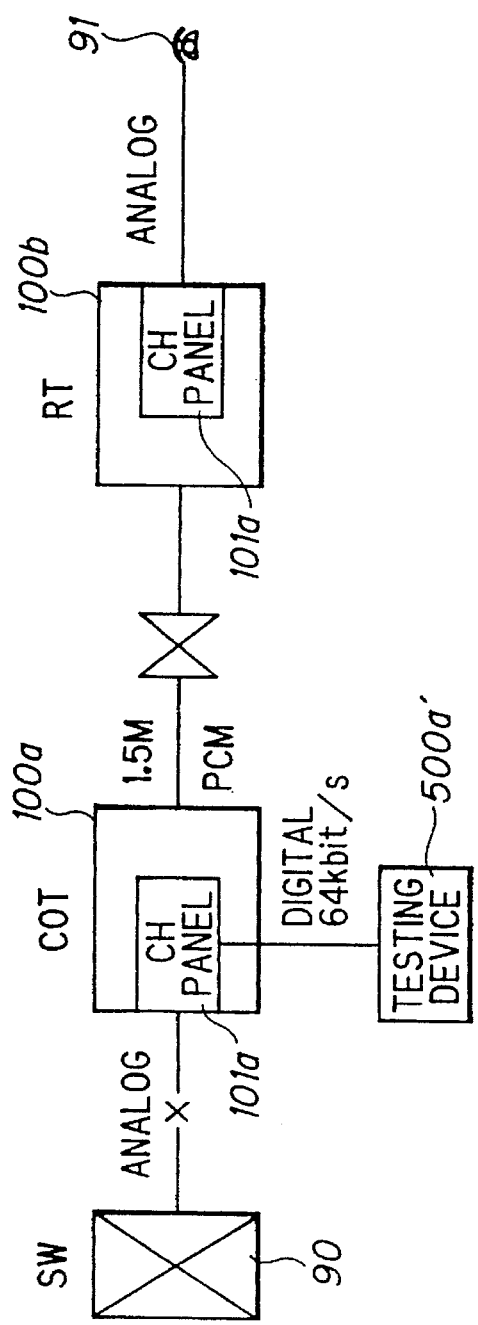
FIGS. 14 and 14A show a diagram for describing an operation-verifying test, which uses a signaling bit, when a telephone is on the hook.
Figure 14A:
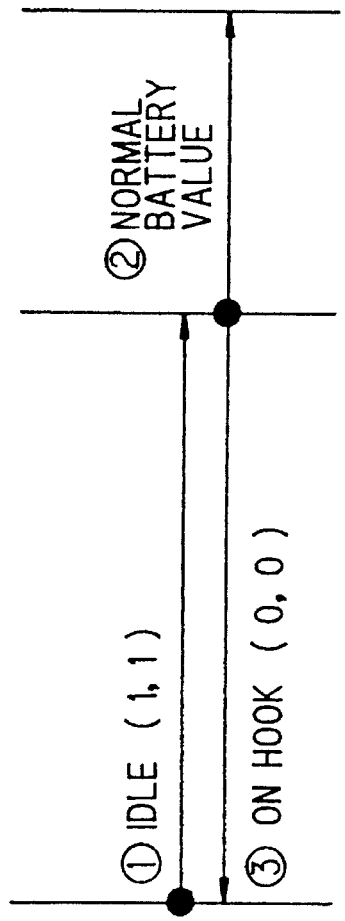

FIGS. 14 and 14A show a diagram for describing an operation-verifying test when a telephone is on the hook (i.e., when the subscriber is not communicating).

① The telephone 91 is placed in the on-hook state.

② With the on-hook state in effect, the testing unit 500a' sends the IDLE code (1,1) to the CH panel (RT) 101a of the DLC on the terminal side. If, when conditions are normal, the CH panel (RT) 101a of the DLC on the terminal side receives the IDLE code, the CH panel 101a applies a normal battery value to the telephone 91 and transmits the on-hook code (0,0) to the CH panel (COT) 101a of the DLC on the switch side.

③ Accordingly, the testing unit 500a' monitors the signaling bit sent from the CH panel (RT) 101a and verifies that operation in the on-hook state is normal depending upon whether the on-hook code (0,0) is received.

Verification of operation at time of outgoing call

Figure 15:
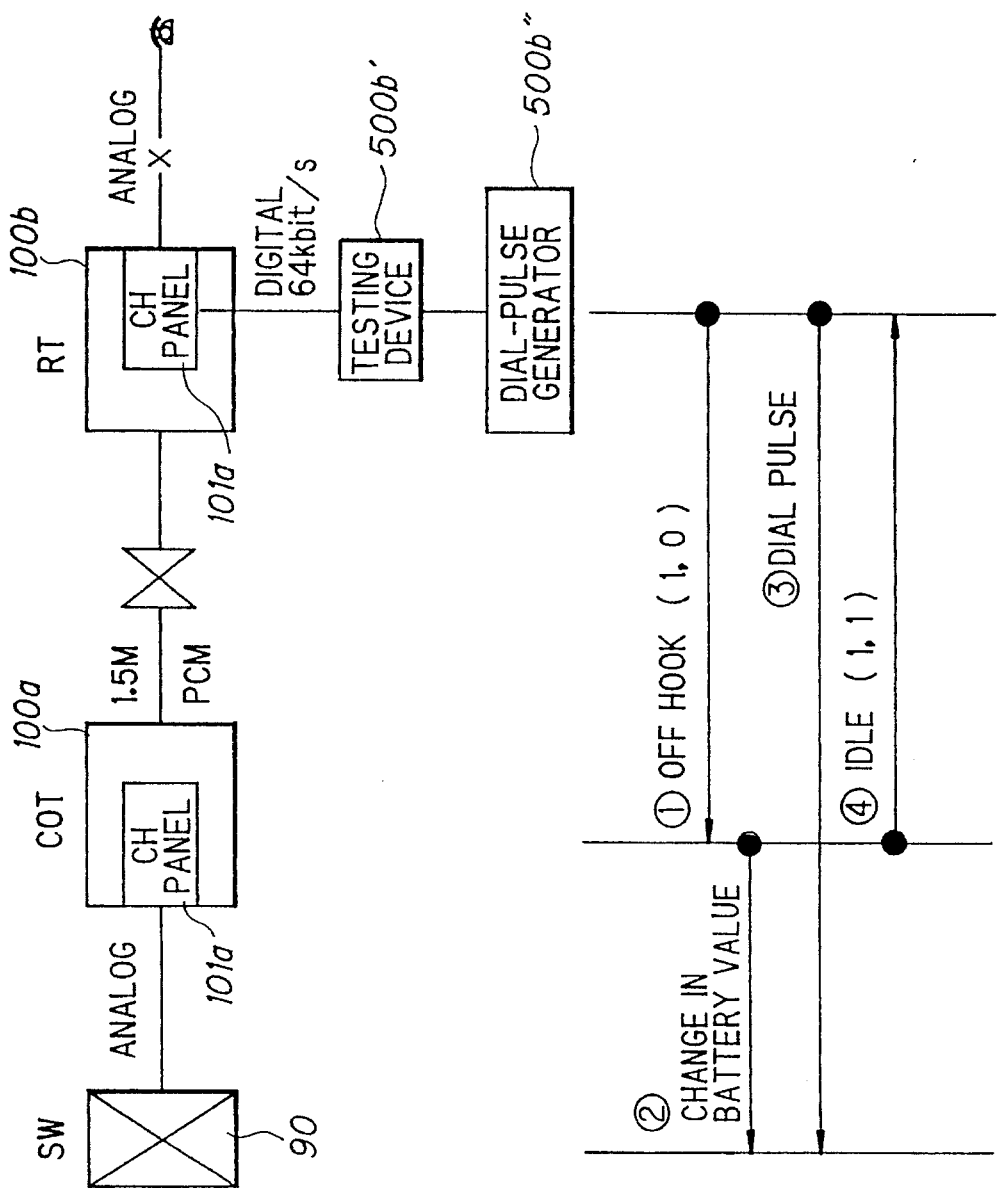
FIG. 15 is a diagram for describing an operation-verifying test, which uses a signaling bit, at the time of an outgoing call.

FIG. 15 is a diagram for describing an operation-verifying test at the time of an outgoing call.

① The testing unit 500b' transmits the off-hook code (1,0) to the switch-side CH panel (COT) 101a.

② When the off-hook code is detected by the CH panel (COT) on the switch side, a load the same as that of the telephone is shown to the switch 90. As a result, the battery value changes and the switch 90 recognizes that off-hook state has been attained.

③ Next, a dial pulse generator 500b" issues dial pulses.

④ After issuance of the dial pulses ends, the CH panel (COT) sends an IDLE code (1,1) to the CH panel (RT). Accordingly, the detecting unit 500b' monitors the signaling bit sent from the CH panel (COT) and verifies that the operation of the switch 90 and CH panel (COT) at the time of an outgoing call is normal based upon whether the IDLE code is received.

Verification of operation at time of incoming call

Figure 16:
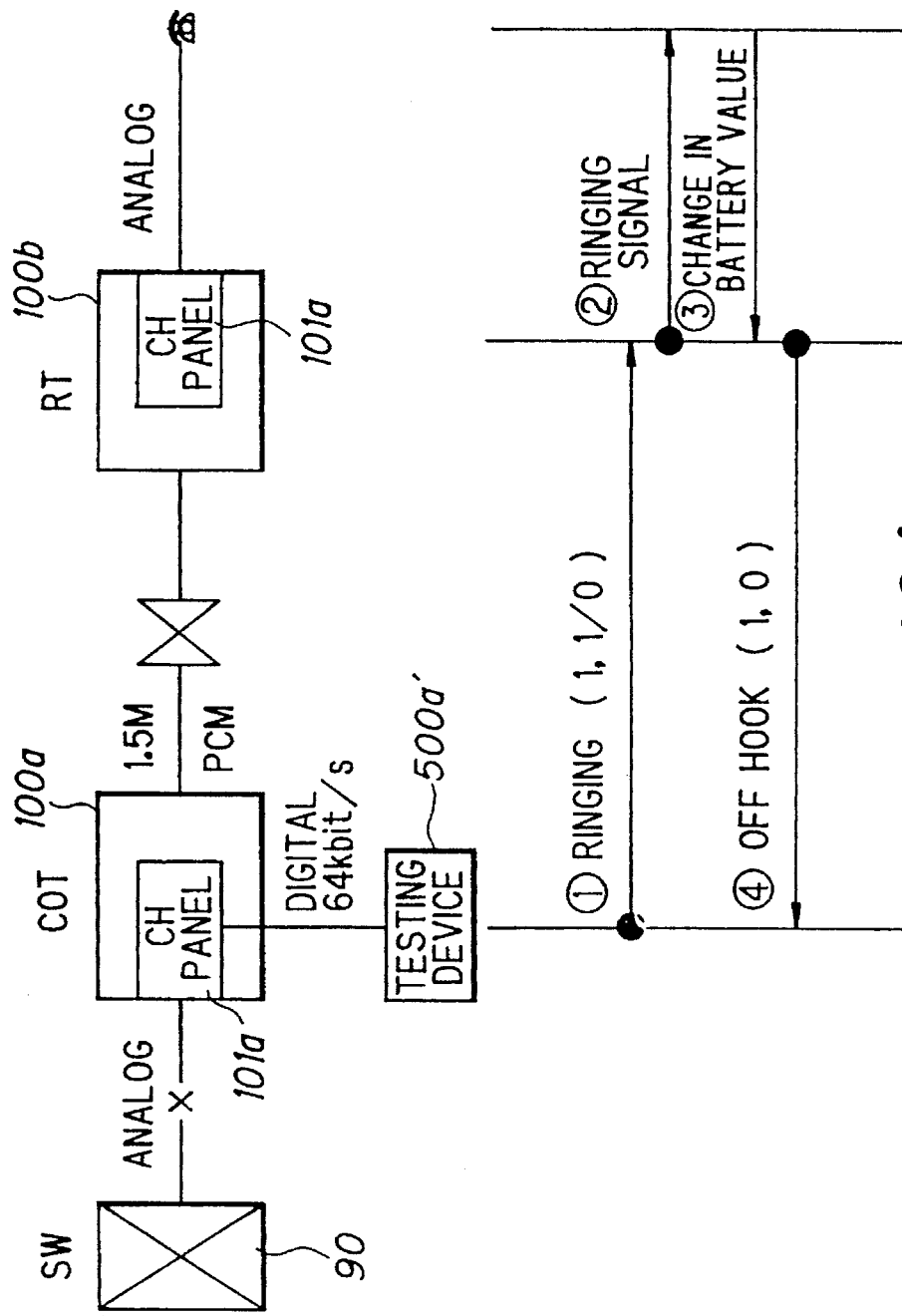

FIGS. 16 and 16A show a diagram for describing an operation-verifying test at the time of an incoming call.

① The testing unit 500a' transmits the RINGING code (in which the A bit is "1" and the B bit is "alternating 1/0") to the CH panel (RT).

② When the CH panel (RT) detects the off-hook code, it sends a ringing signal to the telephone 91 so that the latter is made to issue a ringing tone.

③ When the handset is lifted to place the telephone in the off-hook state, the battery value changes.

④ The CH panel (RT) detects that the battery value has changed, thereby recognizing the off-hook state, and transmits the off-hook code (1,0) to the CH panel (COT). Accordingly, the testing unit 500a' monitors the signaling bit sent from the CH panel (RT) and verifies that the operation of the telephone and CH panel (RT) at the time of an incoming call is normal based upon whether the off-hook code (1,0) is received.

Verification of operation at end of conversation

Figure 17:
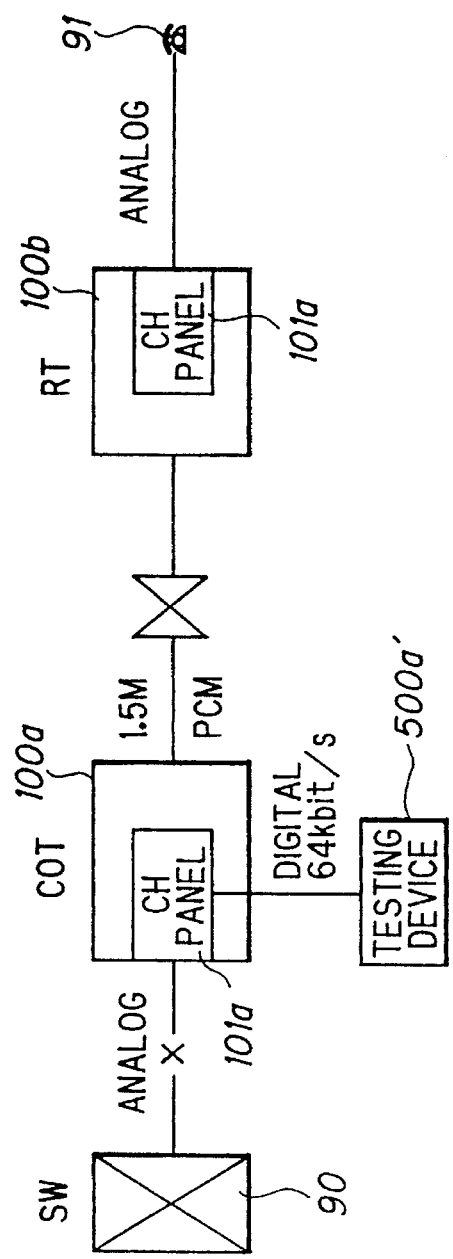
FIGS. 17 and 17A show a diagram for describing an operation-verifying test, which uses a signaling bit, when a conversation ends.
Figure 17A:
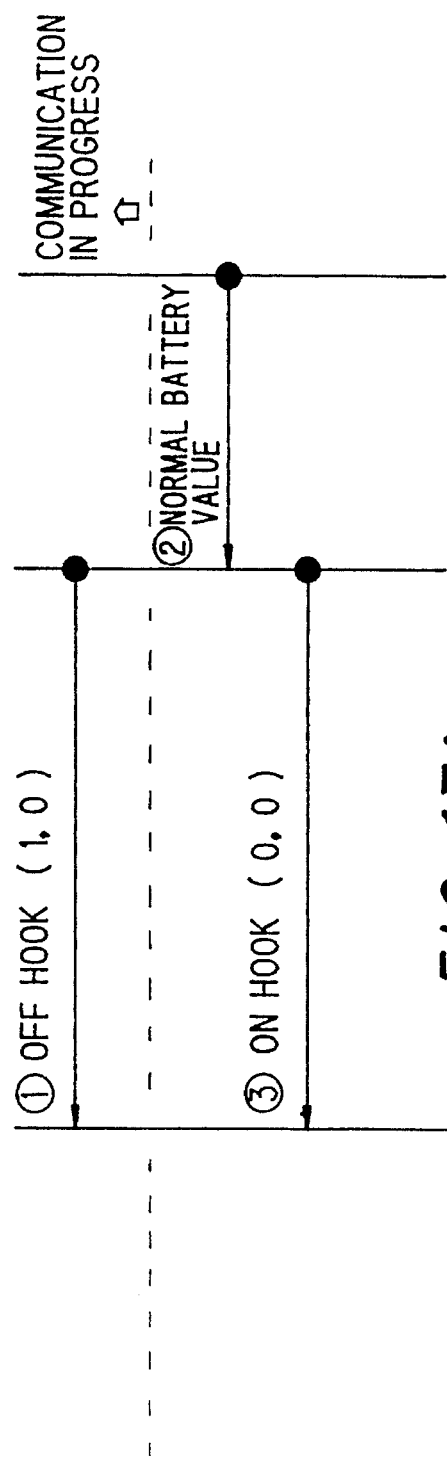

FIGS. 17 and 17A show a diagram for describing an operation-verifying test when a conversion ends.

① The telephone is placed in the off-hook state.

② The telephone is then hung up.

③ When the telephone is hung up, the battery value changes to the normal battery value. Upon detecting the normal battery value, the CH panel (RT) transmits the on-hook code (0,0) to the CH panel (COT). Accordingly, the testing unit 500a' monitors the signaling bit sent from the CH panel (RT) and verifies that the operation of the telephone and CH panel (RT) at the end of a conversation is normal based upon whether the on-hook code (0,0) is received.

In accordance with the present invention, it is possible to test the DLC(COT) and DLC(RT) even if a cable has not been laid between these communication control units (DLCs). As a result, a line test can be conducted in each interval from the time of cable laying, and fault cutting and dividing can be carried out in detailed fashion. This makes it possible to improve reliability in terms of faults in subscriber's lines.

Further, in accordance with the present invention, test paths can be formed automatically. As a result, maintenance is facilitated since it is unnecessary to change the connection of the testing device each time the item to be tested is changed, as is required in the prior art.

Further, in accordance with the present invention, analog and digital tests can be conducted solely by an analog testing unit by incorporating a coder/decoder, a signaling-bit generator and a signaling-bit detector in the subscriber's line testing apparatus. Moreover, it is possible to test the signaling-bit detecting function and signaling-bit transmitting function of a switch or CH panel.

As many apparently widely different embodiments of the present invention can be made without departing from the spirit and scope thereof, it is to be understood that the invention is not limited to the specific embodiments thereof except as defined in the appended claims.

What is claimed is:

1. A testing apparatus for testing subscriber's lines in combination with a communication control unit of a communication system having a plurality of subscriber's lines and at least one digital transmission line wherein the communication control unit is positioned between the plurality of subscriber's lines and the digital transmission line and is configured for A/D-converting analog signals which enter from the plurality of subscriber's lines, into digital signals, subjecting the digital signals to time-shared multiplexing and sending the multiplexed digital signals to the digital transmission line, demultiplexing a time-shared multiplexed digital signal which has entered from the digital transmission line, D/A-converting the demultiplexed digital signal into an analog signal and sending the analog signal to a prescribed subscriber's line, the combination comprising:

said communication control unit including a plurality of subscriber's circuits each connected to a respective subscriber's line;

an information input unit in said testing apparatus for entering identifying information for specifying a subscriber's circuit to be tested in correspondence with a respective subscriber's line and test-path specifying information for each subscriber's circuit, each subscriber' circuit including a coder/decoder for performing the A/D conversion and the D/A conversion, and a test path generator for establishing on a side of the communication control unit a predetermined test path specified by the test-path specifying information;

a communication unit, connected to said information input unit, for sending the test-path specifying information to a specified subscriber's circuit of said communication control unit;

at least one testing unit for applying a test signal to the testing apparatus, said testing unit outputting said test signal to said test path for sending said test signal to the specified subscriber's circuit and receiving therefrom an answer signal generated in response to said test signal for verifying said test path;

a connecting unit for connecting said testing unit to the testing apparatus; and a test-path forming unit connected between said connecting unit and the communication control unit to input said test signal to said test-path generator of said specified subscriber's circuit to establish a test path on a side of the testing apparatus from an output of said testing unit to an input of said testing unit via said test path on the side of the communication control unit to enable outputting of said test signal into said test path on the side of the communication control unit and inputting of said answer signal into said testing unit.

2. The apparatus according to claim 1, further comprising a controller, coupled to said information input unit, said communication unit and said test-path forming unit, for sending a test request to the specified subscriber's circuit via said communication unit, causing said test-path forming unit to form the test path on the side of the testing apparatus, after verifying that said answer signal is a test-allowed signal from the specified subscriber's circuit, and sending the test-path specifying information from said communication unit to the subscriber's circuit, thereby forming the test path on the side of the communication control unit.

3. The apparatus according to claim 1 or 2, further comprising a display unit for displaying the identifying information which specifies the subscriber's circuit being tested, as well as status of the test.

4. The apparatus according to claim 1, wherein in a case where the subscriber's lines in said communication system are connected to a central office switch or respective subscriber's terminals, test-path generators of said subscriber's circuits establish test paths so as to input an analog test signal from said test-path forming unit to the central office switch or subscriber's terminals via the subscriber's lines and input answer signals from the central office switch or subscriber's terminals to said test-path forming unit.

5. The apparatus according to claim 1, wherein, on the basis of the test-path specifying information, test path generators of the subscriber's circuits establish test paths, on the side of the communication control unit, so as to input an analog test signal, which has entered from said testing unit via said connecting unit and said test-path forming unit, to the coder/decoders of said subscriber's circuits and input digital signals outputted from the coder/decoders to said testing unit via said test-path forming unit and said connecting unit or the test path generators establish test paths so as to input a digital test signal, which has entered from said testing unit via said connecting unit and said test-path forming unit, to said coder/decoders and input analog signals, which are outputted from said coder/decoders, to said testing unit via said test-path forming unit and said connecting unit.

6. The apparatus according to claim 1, wherein, in a case where two such communication control units are provided in said communication system wherein a first communication control unit is provided on a side of a subscriber's terminal and a second communication control unit is provided on a side of a central office switch and said first and second communication control units are interconnected via a digital transmission line so as to transmit data to each other, test path generators of one communication control unit establish test paths so as to send over the digital transmission line a digital test signal, which has entered from said testing unit via said connecting unit and said test-path forming unit, on the basis of the test-path specifying information, and test path generators of the other communication control unit establish test paths so as to input the digital test signal, which has entered from the digital transmission line, to said testing unit via said test-path forming unit and said connecting unit on the basis of the test-path specifying information.

7. The apparatus according to claim 1, wherein, in a case where two such communication control units are provided in the communication system of which a first communication control unit is provided on a side of a subscriber's terminal and a second communication control unit is provided on a side of a central office switch and said first and second communication control units are interconnected via a digital transmission line so as to transmit data to each other and where each subscriber's line connected to the second communication control unit on the side of the central office switch is connected to the central office switch, test path generators of the first communication control unit on the side of the subscriber's terminal establish test paths, on the basis of the test-path specifying information, so as to input an analog test signal, which has entered from said testing unit via said connecting unit and said test-path forming unit, to the coder/decoders of said subscriber's circuits of said first communication control unit, send the digital signals outputted from the coder/decoders to the central office switch via the digital transmission line and the second communication control unit on the side of the central office switch, and input an answer signal from the central office switch, which has been received via the second communication control unit on the side of the central office switch and the digital transmission line, to the testing unit via said test-path forming unit and said connection unit.

8. The apparatus according to claim 1, wherein said connecting unit has a first connecting portion for connecting said testing unit formed by an analog testing device and a second connecting portion for connecting said testing unit formed by a digital testing device; and said test-path forming unit forms said test path on the side of the testing apparatus so as to input said answer signal to said analog testing device when the answer signal is analog and input the answer signal to said digital testing device when the answer signal is digital.

9. A testing apparatus for testing subscriber's lines in combination with a communication control unit of a communication system having a plurality of subscriber's lines and a digital transmission line, wherein said communication control unit is positioned between said subscriber's lines and said digital transmission line and is configured for A/D-converting analog signals, which enter from the plurality of subscriber's lines, into digital signals, subjecting the digital signals to time-shared multiplexing and sending the multiplexed digital signals to the digital transmission line, demultiplexing a time-shared multiplexed digital signal which has entered from the digital transmission line, D/A-converting the demultiplexed digital signal into an analog signal and sending the analog signal to a predetermined subscriber's line, the combination comprising:

said communication control unit including a plurality of subscriber's circuits each connected to a respective subscriber's line;

an information input unit for entering identifying information for specifying a subscriber's circuit to be tested in correspondence with a respective subscriber's line and test-path specifying information, each subscriber's circuit including a coder/decoder for performing the A/D conversion and the D/A conversion, and a test path generator for establishing on a side of the communication control unit a predetermined test path specified by the test-path specifying information;

a communication unit connected to said information input unit for sending the test-path specifying information to a specified subscriber's circuit of the communication control unit;

first and second analog testing units each for applying an analog test signal to the testing apparatus by outputting said test signal to said test path for sending said test signal to the specified subscriber's circuit and receiving therefrom an answer signal generated in response to said test signal for verifying said test path;

first and second connecting units for connecting said first and second analog testing units to the testing apparatus;

a coder/decoder for converting an analog test signal, which has entered from said second connecting unit, into a digital signal and converting a digital answer signal, which is received via said test path, into an analog signal; and a test-path forming unit for forming a test path on a side of the testing apparatus in such a manner that an analog test signal that has entered from said first connecting unit or the digital test signal outputted by said coder/decoder is inputted to the test path of the specified subscriber's circuit, an answer signal is inputted to the first analog testing unit via the first connecting unit if the answer signal, which is received via the test path, is analog, and inputs the answer signal to the second analog testing unit via the coder/decoder and the second connecting unit if the answer signal is digital.

10. The apparatus according to claim 9, further comprising:

a signaling-bit generating unit for generating a signaling bit inserted into a digital test signal obtained by digitally converting an analog test signal;

a signaling-bit detector for detecting a signaling bit contained in a digital answer signal;

a display unit for displaying identifying information of a subscriber's circuit undergoing testing and content of the detected signaling bit; and a controller for causing a prescribed signaling bit to be generated in said signaling-bit generator based upon a category of an operation verifying test, commanded from the information input unit, using a signaling bit, and inputting the content of the signaling bit, which has been detected by said signaling-bit detector, to said display unit to display the same.

* * * * *